United States Patent
Sato et al.

(10) Patent No.: US 12,450,879 B2
(45) Date of Patent: Oct. 21, 2025

(54) DATA CREATION SYSTEM, LEARNING SYSTEM, ESTIMATION SYSTEM, PROCESSING DEVICE, EVALUATION SYSTEM, DATA CREATION METHOD, AND PROGRAM

(71) Applicant: Panasonic Intellectual Property Management Co., Ltd., Osaka (JP)

(72) Inventors: Taichi Sato, Kyoto (JP); Ryosuke Goto, Osaka (JP); Yuto Kitagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 304 days.

(21) Appl. No.: 18/249,928

(22) PCT Filed: Nov. 5, 2021

(86) PCT No.: PCT/JP2021/040716
§ 371 (c)(1),
(2) Date: Apr. 20, 2023

(87) PCT Pub. No.: WO2022/102525
PCT Pub. Date: May 19, 2022

(65) Prior Publication Data
US 2023/0394798 A1     Dec. 7, 2023

(30) Foreign Application Priority Data
Nov. 10, 2020  (JP) .................. 2020-187511

(51) Int. Cl.
*G06V 10/00*  (2022.01)
*G06V 10/44*  (2022.01)
*G06V 10/772* (2022.01)

(52) U.S. Cl.
CPC ............ *G06V 10/772* (2022.01); *G06V 10/44* (2022.01)

(58) Field of Classification Search
CPC ........ G06N 20/00; G06N 20/10; G06N 20/20; G06V 10/82; G06V 10/772; G06V 10/774;
(Continued)

(56) References Cited

U.S. PATENT DOCUMENTS 10,909,349 B1 *  2/2021  Tripathi .................. G06T 19/00
11,210,513 B2 * 12/2021  Endoh ..................... G06N 3/08
(Continued)

FOREIGN PATENT DOCUMENTS

EP   3 900 870 A1   10/2021
JP   2017-045441 A   3/2017
(Continued)

OTHER PUBLICATIONS

International Search Report dated Feb. 1, 2022 issued in International Patent Application No. PCT/JP2021/040716, with English translation.
(Continued)

*Primary Examiner* — Amir Alavi
(74) *Attorney, Agent, or Firm* — Rimon P.C.

(57) ABSTRACT

A data creation system creates, based on first image data, second image data for use as learning data to generate a learned model about an object. The data creation system includes a deformer, a remover, a feature acquirer, and a feature assigner. The deformer generates, based on the first image data including a pixel region representing the object, the second image data by causing deformation about the object to the first image data. The remover removes a linear first feature present in the first image data. The feature
(Continued)

acquirer acquires a second feature. The feature assigner assigns the second feature to the second image data.

25 Claims, 10 Drawing Sheets

(58) Field of Classification Search
CPC .... G06V 10/44; G06V 10/273; G06V 10/242; G06T 7/00
See application file for complete search history.

(56) References Cited

U.S. PATENT DOCUMENTS

| | | | |
|---|---|---|---|
| 11,216,971 B2* | 1/2022 | Xu | G06F 18/253 |
| 11,276,179 B2* | 3/2022 | Morales Morales | G06F 18/23213 |
| 11,460,857 B1* | 10/2022 | Tan | G06N 3/084 |
| 11,586,848 B2* | 2/2023 | Yun | G06V 10/82 |
| 11,681,046 B2* | 6/2023 | Dudzik | G06F 18/254 382/103 |
| 11,682,191 B2* | 6/2023 | Shlens | G06F 18/217 382/156 |
| 12,183,047 B2* | 12/2024 | Bhanushali | G06V 10/273 |
| 2008/0107345 A1* | 5/2008 | Melikian | G06V 10/255 382/209 |
| 2018/0082106 A1 | 3/2018 | Inaba et al. | |
| 2019/0139213 A1 | 5/2019 | Kurita et al. | |
| 2019/0188846 A1 | 6/2019 | Tamai | |
| 2019/0197356 A1 | 6/2019 | Kurita et al. | |
| 2020/0211169 A1 | 7/2020 | Tsutsumi | |
| 2022/0044147 A1 | 2/2022 | Sato et al. | |
| 2023/0386181 A1* | 11/2023 | Sato | G06N 3/09 |
| 2023/0394798 A1* | 12/2023 | Sato | G06V 10/772 |

FOREIGN PATENT DOCUMENTS

| | | |
|---|---|---|
| JP | 2018-045608 A | 3/2018 |
| JP | 2019-106112 A | 6/2019 |
| JP | 2019-114116 A | 7/2019 |
| JP | 2020-014799 A | 1/2020 |
| JP | 2020-106461 A | 7/2020 |
| WO | 2020/070876 A1 | 4/2020 |
| WO | 2020/129617 A1 | 6/2020 |

OTHER PUBLICATIONS

Ito Hidemasa, "Deep Learning Data Augmentation Technique to Improve Image Recognition Accuracy", Toshiba's New SPINEX IoT Architecture Reinforcing Digital Transformation, vol. 72 No.4, Toshiba Review, Sep. 30, 2017 with English Abstract.
International Search Report dated Jan. 25, 2022 issued in International Patent Application No. PCT/JP2021/040713, with English translation.
International Search Report dated Jan. 25, 2022 issued in International Patent Application No. PCT/JP2021/040714, with English translation.
International Search Report dated Feb. 1, 2022 issued in International Patent Application No. PCT/JP2021/040715, with English translation.
1 Office Action issued in the related U.S. Appl. No. 18/249,895, dated Jul. 24, 2025.
Office Action issued in the the related Chinese Patent Application No. 202180070302.4, dated Jun. 30, 2025, with Partial English Translation of the Front Page and Search Report.

* cited by examiner

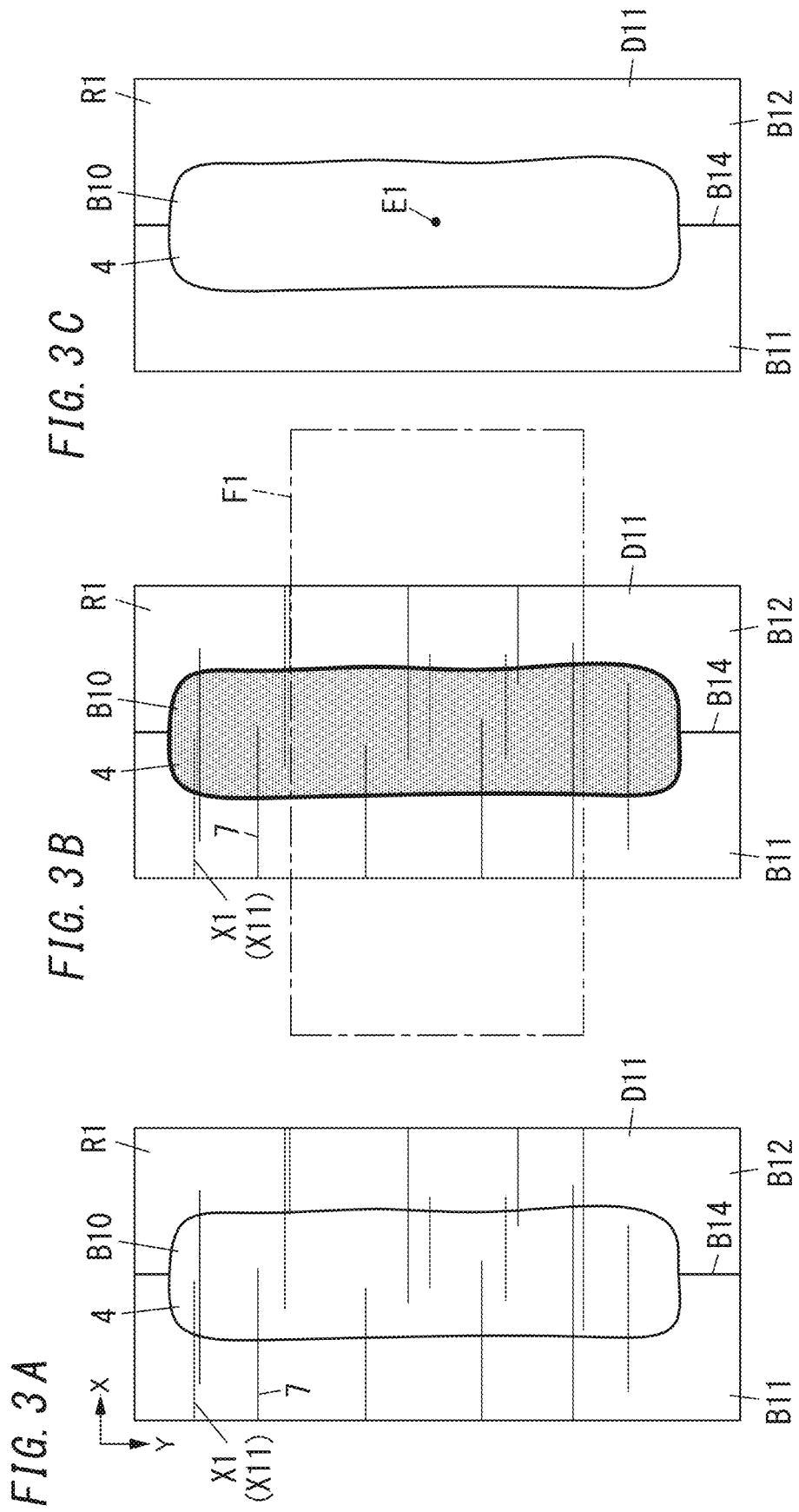

DATA CREATION SYSTEM, LEARNING SYSTEM, ESTIMATION SYSTEM, PROCESSING DEVICE, EVALUATION SYSTEM, DATA CREATION METHOD, AND PROGRAM

CROSS-REFERENCE OF RELATED APPLICATIONS

This application is the U.S. National Phase under 35 U.S.C. § 371 of International Patent Application No. PCT/JP2021/040716, filed on Nov. 5, 2021, which in turn claims the benefit of Japanese Patent Application No. 2020-187511, filed on Nov. 10, 2020, the entire disclosures of which Applications are incorporated by reference herein.

TECHNICAL FIELD

The present disclosure generally relates to a data creation system, a learning system, an estimation system, a processing device, an evaluation system, a data creation method, and a program. More particularly, the present disclosure relates to a data creation system for creating image data for use as learning data to generate a learned model about an object, a learning system for generating the learned model, and an estimation system that uses the learned model. The present disclosure also relates to a processing device for use in the data creation system and an evaluation system including the processing device. The present disclosure further relates to a data creation method and program for creating image data for use as learning data to generate a learned model about an object.

BACKGROUND ART

Patent Literature 1 discloses an X-ray image object recognition system. In the X-ray image object recognition system, a learning network performs machine learning using a learning set including an X-ray image of an object and a label. Patent Literature 1 also teaches, when the amount of learning data is insufficient, performing, as processing of expanding the learning data, data augmentation for increasing a pseudo number of images by making artificial manipulations such as moving, rotation, scaling up or down, and/or flipping on the original image.

Patent Literature 1 further teaches that performing such data augmentation by moving, rotating, scaling up or down, and/or flipping the original image would create an image representing an unreal scene and make unintended learning to cause a decline in object recognition performance in the inference phase. Thus, the X-ray image object recognition system avoids performing such unintended data augmentation by appropriately setting parameters (which include at least one of the X-ray image scaling factor, magnitude of shift, or rotational angle) for use in the data augmentation.

The X-ray image object recognition system of Patent Literature 1 just sets those parameters such as X-ray image scaling factor, magnitude of shift, and rotational angle. Thus, depending on the object, there are still chances of creating an unreal image. Consequently, this would cause a decline in object recognition performance in the inference phase.

CITATION LIST

Patent Literature

Patent Literature 1: JP 2020-14799 A

SUMMARY OF INVENTION

In view of the foregoing background, it is therefore an object of the present disclosure to provide a data creation system, a learning system, an estimation system, a processing device, an evaluation system, a data creation method, and a program, all of which are configured or designed to reduce the chance of causing a decline in object recognition performance.

A data creation system according to an aspect of the present disclosure creates, based on first image data, second image data for use as learning data to generate a learned model about an object. The data creation system includes a deformer, a remover, a feature acquirer, and a feature assigner. The deformer generates, based on the first image data including a pixel region representing the object, the second image data by causing deformation about the object to the first image data. The remover removes a linear first feature present in the first image data. The feature acquirer acquires a second feature. The feature assigner assigns the second feature to the second image data.

A processing device according to another aspect of the present disclosure functions as a first processing device out of the first processing device and a second processing device of the data creation system described above. The first processing device includes a feature extractor that extracts the first feature from the first image data. The second processing device includes the feature assigner.

Another processing device according to still another aspect of the present disclosure functions as a second processing device out of a first processing device and the second processing device of the data creation system described above. The first processing device includes a feature extractor that extracts the first feature from the first image data. The second processing device includes the feature assigner.

Another data creation system according to yet another aspect of the present disclosure creates image data for use as learning data to generate a learned model about an object. The data creation system includes a feature acquirer and a feature assigner. The feature acquirer acquires a linear feature. The feature assigner assigns the linear feature to the image data including a pixel region representing the object.

A learning system according to yet another aspect of the present disclosure generates the learned model using a learning data set including the learning data as the image data created by any of the data creation systems described above.

An estimation system according to yet another aspect of the present disclosure estimates a particular condition of the object as an object to be recognized using the learned model generated by the learning system described above.

An evaluation system according to yet another aspect of the present disclosure estimates a particular condition of an object. The evaluation system includes a processing device and an estimation system. The processing device extracts a linear first feature present in first image data including a pixel region representing an object. The processing device outputs information representing the first feature thus extracted. The estimation system outputs, in response to image data created by assigning a second feature to the second image data, an estimation result similar to a situation where the first image data is subjected to estimation made about a particular condition of the object. The second image data is generated by removing the first feature from the first image data and causing deformation about the object to the first image data.

Another learning system according to yet another aspect of the present disclosure functions as a learning system that generates a learned model to be used by the estimation system to make the estimation in the evaluation system described above.

Another processing device according to yet another aspect of the present disclosure functions as the processing device of the evaluation system described above.

Another estimation system according to yet another aspect of the present disclosure functions as the estimation system of the evaluation system described above.

A data creation method according to yet another aspect of the present disclosure is a method for creating, based on first image data, second image data for use as learning data to generate a learned model about an object. The data creation method includes a deforming step, a removing step, a feature acquiring step, and a feature assigning step. The deforming step includes generating, based on the first image data including a pixel region representing the object, the second image data by causing deformation about the object to the first image data. The removing step includes removing a linear first feature present in the first image data. The feature acquiring step includes acquiring a second feature. The feature assigning step includes assigning the second feature to the second image data.

Another data creation method according to yet another aspect of the present disclosure is a method for creating image data for use as learning data to generate a learned model about an object. The data creation method includes a feature acquiring step and a feature assigning step. The feature acquiring step includes acquiring a linear feature. The feature assigning step includes assigning the linear feature to the image data including a pixel region representing the object.

A program according to yet another aspect of the present disclosure is designed to cause one or more processors to perform any of the data creation methods described above.

BRIEF DESCRIPTION OF DRAWINGS

FIG. 3A is a schematic representation of the first image data;

FIG. 3B illustrates how the data creation system performs object extraction processing;

FIG. 3C illustrates how the data creation system performs removal processing;

DESCRIPTION OF EMBODIMENTS (1) Overview

The drawings to be referred to in the following description of embodiments are all schematic representations. Thus, the ratio of the dimensions (including thicknesses) of respective constituent elements illustrated on the drawings does not always reflect their actual dimensional ratio.

Figure 1:
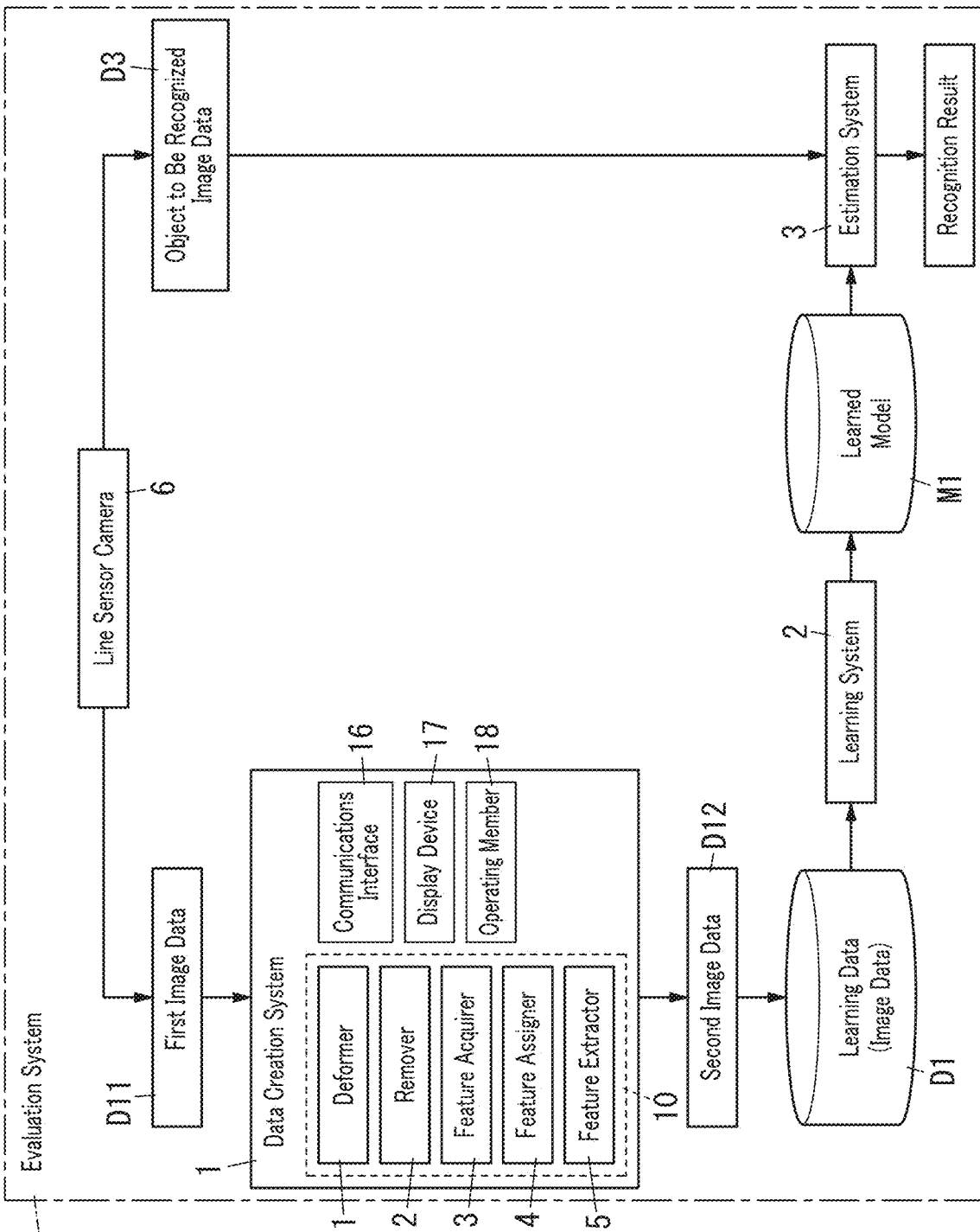
FIG. 1 is a block diagram illustrating a schematic configuration for an overall evaluation system including a data creation system according to an exemplary embodiment.

A data creation system 1 according to an exemplary embodiment creates, based on first image data D11, second image data D12 for use as learning data to generate a learned model M1 about an object 4 (refer to FIGS. 2 and 3A), as shown in FIG. 1. In other words, the second image data D12 is learning data for use to generate a model by machine learning. As used herein, the "model" refers to a program designed to estimate, in response to input of data about an object to be recognized (object 4), the condition of the object to be recognized and output a result of estimation (recognition result). Also, as used herein, the "learned model" refers to a model about which machine learning using learning data is completed. Furthermore, the "learning data (set)" refers to a data set including, in combination, input information (image data D1) to be entered for a model and a label attached to the input information, i.e., so-called "training data." That is to say, in this embodiment, the learned model M1 is a model about which machine learning has been done by supervised learning.

Figure 2:
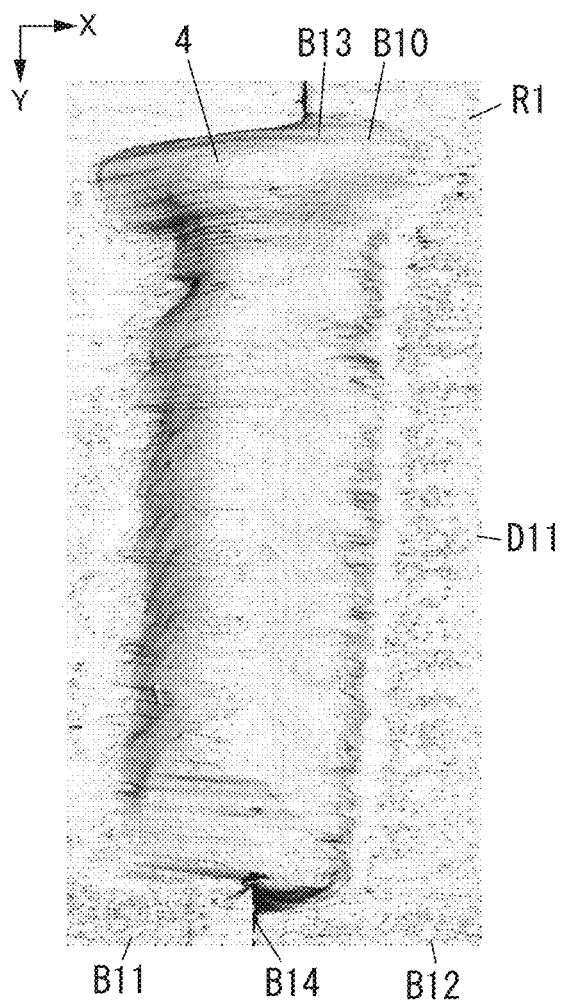
FIG. 2 is a plan view of first image data input to the data creation system.

In this embodiment, the object 4 as an object to be recognized may be, for example, a bead B10 as shown in FIGS. 2 and 3A. The bead B10 is formed, when two or more welding base materials (e.g., a first base metal B11 and a second base metal B12 in this example) are welded together via a welding material B13, in a boundary B14 (welding spot) between the first base metal B11 and the second base metal B12. The dimensions and shape of the bead B10 depend mainly on the welding material B13. Thus, when object to be recognized image data D3 covering the bead B10 is entered, the learned model M1 estimates the condition (particular condition) of the bead B10 and outputs a result of estimation. Specifically, the learned model M1 outputs, as the result of estimation, information indicating whether the bead B10 is a defective product or a non-defective (i.e., good) product and information about the type of the defect if the bead B10 is a defective product. That is to say, the learned model M1 is used to determine whether the bead B10 is a good product or not. In other words, the learned model M1 is used to conduct a weld appearance test to determine whether welding has been done properly.

Decision about whether the bead B10 is good or defective may be made depending on, for example, whether the length of the bead B10, the height of the bead B10, the angle of elevation of the bead B10, the throat depth of the bead B10, the excess metal of the bead B10, and the misalignment of the welding spot of the bead B10 (including the degree of shift of the beginning of the bead B10) fall within their respective tolerance ranges. For example, if at least one of these parameters enumerated above fails to fall within its tolerance range, then the bead B10 is determined to be a defective product. Alternatively, decision about whether the bead B10 is good or defective may also be made depending on, for example, whether the bead B10 has any undercut, whether the bead B10 has any pit, whether the bead B10 has any sputter, and whether the bead B10 has any projection.

For example, if at least one of these imperfections enumerated above is spotted, then the bead B10 is determined to be a defective product.

To make machine learning about a model, a great many image data items about the objects to be recognized, including defective products, need to be collected as learning data. However, if the objects to be recognized turn out to be defective at a low frequency of occurrence, then learning data required to generate a learned model M1 with high recognizability tends to be short. Thus, to overcome this problem, machine learning about a model may be made with the number of learning data items increased by performing data augmentation processing about learning data (hereinafter referred to as either "first image data D11" or "original learning data") acquired by actually shooting the bead B10 with an image capture device (line sensor camera 6). As used herein, the data augmentation processing refers to the processing of expanding learning data by subjecting the learning data to various types of processing (transformation processing) such as translation, scaling up or down (expansion or contraction), rotation, flipping, and addition of noise, for example.

The first image data D11 may be, for example, distance image data. In this case, the first image data D11 as original learning data may have, depending on the performance of an image capture device (line sensor camera 6) including a distance image sensor during the scanning operation, a large number of thin straight stripes 7 (refer to FIG. 3A, for example). In FIG. 3A and other drawings, only some of the large number of stripes 7 are schematically indicated by solid lines to indicate the directivities of those stripes 7 clearly for the sake of convenience of description. However, those solid lines do not indicate the exact positions and number of those stripes 7 and should not be construed as limiting. Also, FIG. 3A is a schematic version of the plan view shown in FIG. 2 for the sake of convenience of description.

Such "stripes" may be caused by, for example, a camera shake due to hand tremors of an articulated robot holding the line sensor camera 6. When the line sensor camera 6 that has scanned one line of an object of shooting starts to scan the next line, the distance to the object of shooting may be slightly different due to the camera shake. As a result, a "stripe" surfaces as a difference (in the distance from the distance image sensor to the object 4) in pixel value within the image data at the boundary between these lines of scanning (hereinafter referred to as "scan lines"). The width of each scan line varies depending on, for example, the resolution of the robot in the feed direction but may be, for example, a few split millimeters.

If first image data D11 with a lot of thin straight stripes 7 were subjected to deformation about the object 4 (e.g., rotated around the center E1 of the first image data D11) by data augmentation processing, then those straight stripes 7 could also change into an unintended condition. Consequently, a learned model reflecting the stripes in such an unintended condition (e.g., stripes aligned with a direction different from the direction of the scan lines) could be generated. Nevertheless, the object to be recognized image data D3 that may be entered actually has no such stripes, thus possibly causing a decline in the performance of recognizing the object 4 in the inference phase.

As shown in FIG. 1, a data creation system 1 according to an implementation of this embodiment includes a deformer 11, a remover 12, a feature acquirer 13, and a feature assigner 14. The deformer 11 generates, based on the first image data D11 including a pixel region R1 (refer to FIG. 2) representing the object 4, the second image data D12 by causing deformation about the object 4 to the first image data D11. The remover 12 removes a linear first feature X1 present in the first image data D11. The feature acquirer 13 acquires a second feature X2. The feature assigner 14 assigns the second feature X2 to the second image data D12.

In this embodiment, the linear first feature X1 includes a straight feature X11 as an example. A straight stripe 7 concerning the boundary between two adjacent scan lines corresponds to such a straight feature X11. Also, in this embodiment, the second feature X2 includes the linear first feature X1 (stripe 7) present in the first image data D11. The feature acquirer 13 acquires, as the second feature X2, the first feature X1 from the first image data D11.

In short, the first image data D11 includes a region which may exist in the real world even after rotation, for example, and a region which cannot exist in the real world after rotation. The straight stripe 7 is an example of the latter.

According to this embodiment, the linear first feature X1 present in the first image data D11 is removed and the second feature X2 is assigned to the second image data D12. This reduces the chances of creating unreal image data that would be generated if the linear first feature X1 subjected to the deformation remained in the second image data D12. In other words, this enables pseudo data creation (such as data augmentation) so that the data created is closer to image data that can exist in the real world. Consequently, this contributes to reducing the chances of causing a decline in the performance of recognizing the object 4.

Also, a learning system 2 (refer to FIG. 1) according to this embodiment generates the learned model M1 using a learning data set including the learning data as the image data created by the data creation system 1. This enables providing a learning system 2 contributing to reducing the chances of causing a decline in the performance of recognizing the object 4. The learning data for use to generate the learned model M1 may include not only the second image data D12 (augmented data) but also the original first image data D11 as well. In other words, the image data D1 according to this embodiment includes at least the second image data D12 and may include both the first image data D11 and the second image data D12.

An estimation system 3 (refer to FIG. 1) according to this embodiment estimates a particular condition of an object 4 (e.g., bead B10 in this example) as the object to be recognized using the learned model M1 generated by the learning system 2. This enables providing an estimation system 3 contributing to reducing the chances of causing a decline in the performance of recognizing the object 4.

A data creation method according to this embodiment is a method for creating, based on first image data D11, second image data D12 for use as learning data to generate a learned model M1 about an object 4. The data creation method includes a deforming step, a removing step, a feature acquiring step, and a feature assigning step. The deforming step includes generating, based on the first image data D11 including a pixel region R1 representing the object 4, the second image data D12 by causing deformation about the object 4 to the first image data D11. The removing step includes removing a linear first feature X1 present in the first image data D11. The feature acquiring step includes acquiring a second feature X2. The feature assigning step includes assigning the second feature X2 to the second image data D12. This enables providing a data creation method contributing to reducing the chances of causing a decline in the performance of recognizing the object 4. The data creation method is used on a computer system (data creation system 1). That is to say, the data creation method is also implementable as a program. A program according to this embodiment is designed to cause one or more processors to perform the data creation method according to this embodiment.

(2) Details

Next, an overall system including the data creation system 1 according to this embodiment (hereinafter referred to as an "evaluation system 100") will now be described in detail with reference to FIGS. 1-5.

(2.1) Overall Configuration

As shown in FIG. 1, the evaluation system 100 includes the data creation system 1, the learning system 2, the estimation system 3, and one or more line sensor cameras 6 (only one of which is shown in FIG. 1).

The data creation system 1, the learning system 2, and the estimation system 3 are supposed to be implemented as, for example, a server. The "server" as used herein is supposed to be implemented as a single server device. That is to say, major functions of the data creation system 1, the learning system 2, and the estimation system 3 are supposed to be provided for a single server device.

Alternatively, the "server" may also be implemented as a plurality of server devices. Specifically, the functions of the data creation system 1, the learning system 2, and the estimation system 3 may be provided for three different server devices, respectively. Alternatively, two out of these three systems may be provided for a single server device. Optionally, those server devices may form a cloud computing system, for example.

Furthermore, the server device may be installed either inside a factory as a place where welding is performed or outside the factory (e.g., at a service headquarters), whichever is appropriate. If the respective functions of the data creation system 1, the learning system 2, and the estimation system 3 are provided for three different server devices, then each of these server devices is preferably connected to the other server devices to be ready to communicate with the other server devices.

The data creation system 1 is configured to create image data D1 for use as learning data to generate the learned model M1 about the object 4. As used herein, to "create learning data" may refer to not only generating new learning data separately from the original learning data but also generating new learning data by updating the original learning data.

The learned model M1 as used herein may include, for example, either a model that uses a neural network or a model generated by deep learning using a multilayer neural network. Examples of the neural networks may include a convolutional neural network (CNN) and a Bayesian neural network (BNN). The learned model M1 may be implemented by, for example, installing a learned neural network into an integrated circuit such as an application specific integrated circuit (ASIC) or a field-programmable gate array (FPGA). However, the learned model M1 does not have to be a model generated by deep learning. Alternatively, the learned model M1 may also be a model generated by a support vector machine or a decision tree, for example.

In this embodiment, the data creation system 1 has the function of expanding the learning data items by performing data augmentation processing on the original learning data (first image data D11) as described above. In the following description, a person who uses the evaluation system 100 including the data creation system 1 will be hereinafter simply referred to as a "user." The user may be, for example, an operator who monitors a manufacturing process such as a welding process step in a factory or a chief administrator.

As shown in FIG. 1 the data creation system 1 includes a processor 10, a communications interface 16, a display device 17, and an operating member 18.

In the example illustrated in FIG. 1, a storage device for storing the learning data (image data D1) is provided outside of the data creation system 1. However, this is only an example and should not be construed as limiting. Alternatively, the data creation system 1 may further include a storage device. In that case, the storage device may also be a memory built in the processor 10. The storage device for storing the image data D1 includes a programmable non-volatile memory such as an electrically erasable programmable read-only memory (EEPROM).

Optionally, some functions of the data creation system 1 may be distributed in a telecommunications device with the capability of communicating with the server. Examples of the "telecommunications devices" as used herein may include personal computers (including laptop computers and desktop computers) and mobile telecommunications devices such as smartphones and tablet computers. In this embodiment, the functions of the display device 17 and the operating member 18 are provided for the telecommunications device to be used by the user. A dedicated application software program allowing the telecommunications device to communicate with the server is installed in advance in the telecommunications device.

The processor 10 may be implemented as a computer system including one or more processors (microprocessors) and one or more memories. That is to say, the one or more processors may perform the functions of the processor 10 by executing one or more programs (applications) stored in the one or more memories. In this embodiment, the program is stored in advance in the memory of the processor 10. Alternatively, the program may also be downloaded via a telecommunications line such as the Internet or distributed after having been stored in a non-transitory storage medium such as a memory card.

The processor 10 performs the processing of controlling the communications interface 16, the display device 17, and the operating member 18. The functions of the processor 10 are supposed to be performed by the server. In addition, the processor 10 also has the function of performing image processing. As shown in FIG. 1, the processor 10 includes the deformer 11, the remover 12, the feature acquirer 13, and the feature assigner 14. These constituent elements of the processor 10 will be described in detail in the next section.

The display device 17 may be implemented as either a liquid crystal display or an organic electroluminescent (EL) display. The display device 17 is provided for the telecommunications device as described above. Optionally, the display device 17 may also be a touchscreen panel display. The display device 17 displays (outputs) information about the first image data D11 and the second image data D12. In addition, the display device 17 also displays various types of information about the generation of learning data besides the first image data D11 and the second image data D12.

The communications interface 16 is a communications interface for communicating with one or more line sensor cameras 6 either directly or indirectly via, for example, another server having the function of a production management system. In this embodiment, the function of the communications interface 16, as well as the function of the processor 10, is supposed to be provided for the same server. However, this is only an example and should not be construed as limiting. Alternatively, the function of the communications interface 16 may also be provided for the telecommunications device, for example. The communications interface 16 receives, from the line sensor camera 6, the first image data D11 as the original learning data.

The first image data D11 may be, for example, distance image data, as described above, and includes a pixel region R1 representing the object 4. Alternatively, the first image data D11 may also be luminance image data. As described above, the object 4 may be, for example, the bead B10 formed, when the first base metal B11 and the second base metal B12 are welded together via the welding material B13, in the boundary B14 between the first base metal B11 and the second base metal B12. That is to say, the first image data D11 is data captured by a distance image sensor of the line sensor camera 6 and including the pixel region R1 representing the bead B10.

The first image data D11 is chosen as the target of the data augmentation processing in accordance with, for example, the user's command from a great many image data items about the object 4 shot with the line sensor camera 6. The evaluation system 100 preferably includes a user interface (which may be the operating member 18) that accepts the user's command about his or her choice.

Examples of the operating member 18 include a mouse, a keyboard, and a pointing device. The operating member 18 may be provided, for example, for the telecommunications device to be used by the user as described above. If the display device 17 is a touchscreen panel display of the telecommunications device, then the display device 17 may also have the function of the operating member 18.

The learning system 2 generates the learned model M1 using a learning data set including a plurality of image data items D1 (including a plurality of second image data items D12) created by the data creation system 1. The learning data set is generated by attaching a label indicating either a good product or a defective product or a label indicating the type and location of the defect as for the defective product to each of a plurality of image data items D1. Examples of the types of defects include undercut, pit, and sputter. The work of attaching the label is performed on the evaluation system 100 by the user via a user interface such as the operating member 18. In one variation, the work of attaching the label may also be performed by a learned model having the function of attaching a label to the image data D1. The learning system 2 generates the learned model M1 by making, using the learning data set, machine learning about the conditions (including a good condition, a bad condition, the type of the defect, and the location of the defect) of the object 4 (e.g., the bead B10).

Optionally, the learning system 2 may attempt to improve the performance of the learned model M1 by making re-learning using a learning data set including newly acquired learning data. For example, if a new type of defect is found in the object 4 (e.g., the bead B10), then the learning system 2 may be made to do re-learning about the new type of defect.

The estimation system 3 estimates, using the learned model M1 generated by the learning system 2, the particular conditions (including a good condition, a bad condition, the type of the defect, and the location of the defect) of the object 4 as the object to be recognized. The estimation system 3 is configured to be ready to communicate with one or more line sensor cameras 6 either directly or indirectly via, for example, another server having the function of a production management system. The estimation system 3 receives object to be recognized image data D3 generated by shooting the bead B10, which has been formed by actually going through a welding process step, with the line sensor camera 6.

The estimation system 3 determines, based on the learned model M1, whether the object 4 shot in the object to be recognized image data D3 is a good product or a defective product and estimates, if the object 4 is a defective product, the type and location of the defect. The estimation system 3 outputs the result of recognition (i.e., the result of estimation) about the object to be recognized image data D3 to, for example, the telecommunications device used by the user or the production management system. This allows the user to check the result of estimation through the telecommunications device. Optionally, the production management system may control the production facility to discard a welded part that has been determined, based on the result of estimation acquired by the production management system, to be a defective product before the part is transported and subjected to the next processing step.

(2.2) Data Augmentation Processing

The processor 10 has the functions of performing, as data augmentation processing, "feature extraction processing," "object extraction processing," "removal processing," "deformation processing," and "feature assignment processing." Specifically, as shown in FIG. 1, the processor 10 includes the deformer 11, the remover 12, the feature acquirer 13, the feature assigner 14, and a feature extractor 15.

The feature acquirer 13 is configured to acquire a second feature X2. In this embodiment, the second feature X2 may include, for example, a linear first feature X1 present in the first image data D11. The feature acquirer 13 acquires, as the second feature X2, the first feature X1 from the first image data D11. The first feature X1 is extracted (i.e., "feature extraction processing" is performed) by the feature extractor 15. That is to say, the feature acquirer 13 acquires, as the second feature X2, the first feature X1 extracted by the feature extractor 15 from the first image data D11.

In this embodiment, the linear first feature X1 includes a straight feature X11. As described above, the straight stripe 7 as a feature concerning the boundary between two adjacent scan lines corresponds to the straight feature X11. That is to say, the straight feature X11 is a feature concerning the boundary (stripe 7) between a plurality of scan lines on the first image data D11 depending on the line sensor camera 6 that has shot the object 4. In FIGS. 2 and 3A, the first base metal B11 and the second base metal B12 are arranged side by side along the X-axis (i.e., laterally) and the bead B10 is formed to be elongate along the Y-axis (i.e., vertically). FIG. 3A schematically illustrates the bead B10 and the plurality of straight stripes 7 shown in FIG. 2 and the plurality of straight stripes 7 extend along the X-axis. That is to say, in this embodiment, the first image data D11 includes a plurality of linear first features X1, in particular, a plurality of straight features X11. The plurality of linear first features X1 are correlated to each other in terms of linearity. In this example, the plurality of linear first features X1 have such linearity that makes the linear first features X1 substantially parallel to each other.

Next, it will be described specifically how the feature extractor 15 may perform exemplary feature extraction processing.

To identify a linear first feature X1, for example, the feature extractor 15 acquires feature information about the straight feature X11 from the user. The user enters the feature information into the data creation system 1 via the operating member 18, for example.

Specifically, for example, the user may check, with the naked eye, the first image data D11 displayed on the screen by the display device 17 to determine the respective directions, locations, and other parameters of a large number of straight stripes 7 involved with the scan lines. The user enters, using the operating member 18, an operating command to specify the direction of the stripes 7 (e.g., their tilt with respect to the X-axis). That is to say, the feature information includes information specifying the direction (e.g., the direction aligned with the X-axis in this case) of the stripes 7. Optionally, the feature information may include function data representing the linearity of the stripes 7. Alternatively, the feature information may include information directly specifying the location coordinates of a pixel region representing one or more stripes 7. In one specific example, to directly specify a stripe 7, first, the user selects two points included in the stripe 7 using a mouse pointer and specifies the two points by clicking the mouse. The feature extractor 15 calculates a straight line passing through the two points thus specified and superimposes the straight line thus calculated on the first image data D11. The display device 17 displays the first image data D11 on which the straight line is superimposed and an end button. The user checks the straight line displayed and, when there is no problem, selects the end button using the mouse pointer and clicks the mouse. The feature extractor 15 acquires information representing the straight line thus calculated as the feature information. The feature extractor 15 stores the feature information in, for example, a memory of the processor 10. The feature extractor 15 may have the function of storing, in the memory of the processor 10, for example, information to identify the stripe 7 and automatically extracting, by reference to the information, the feature information from the first image data D11.

The feature extractor 15 acquires (extracts), by reference to the feature information, information about the difference in the height (pixel value) of the object of shooting from one scan line to another in the first image data D11, in other words, information about the difference in the distance from the object of shooting to the distance image sensor. The object of shooting corresponds to either the object 4 or the first and second base metals B11, B12 in the vicinity of the object 4. As used herein, the "height" is a component in a direction perpendicular to the X-Y plane and the height of the object 4 may be a height measured from, for example, an installation plane (which may be a virtual plane) on which the object 4 is installed.

That is to say, although the height may be actually substantially the same between one scan line and the next scan line, a slight height difference (pixel value difference) is caused due to, for example, a shake of the articulated robot, thus expressing the stripe 7 (as the first feature X1). In other words, the straight feature X11 is a feature based on a pixel value difference corresponding to the height difference that may be caused between a plurality of scan lines due to a difference in the distance from the line sensor camera 6 to the object 4. The feature extractor 15 acquires information about the height of each scan line (which may be an average or variance of the height) and stores the information in, for example, the memory of the processor 10. The information about the height of the scan line will be hereinafter sometimes referred to as "scan line information." The scan line information may be information about a set of differences, each of which is a difference between each point (pixel) on a scan line of interest and the value of a pixel adjacent to the former pixel in a direction different from the scan line. Alternatively, the scan line information may also be the average and variance of the differences.

The deformer 11 is configured to generate, based on the first image data D11 including a pixel region R1 representing the object 4 (e.g., the bead B10), the second image data D12 by causing deformation about the object 4 to the first image data D11. That is to say, the deformer 11 generates the second image data D12 by deforming the bead B10 in the first image data D11 by image processing (such as affine transformation or projective transformation), i.e., by performing the "deformation processing." The deformation about the object 4 may include at least one selected from the group consisting of rotation, flipping, translation, and scaling up or down of the object 4. In this embodiment, the "deformation about the object 4" includes rotation of the object 4 as an example.

The deformer 11 extracts first, before performing the deformation processing, information about a pixel region of the object 4 based on the pixel value difference from the first image data D11 (i.e., performs the "object extraction processing"). The deformer 11 extracts a pixel region of the bead B10 by image processing such as edge detection processing. In FIG. 3B, the pixel region of the bead B10 extracted by the deformer 11 is indicated by dotted hatching for the sake of convenience of description. Alternatively, the pixel region of the object 4 may also be specified in accordance with the user's command entered via the operating member 18.

Figure 4A:
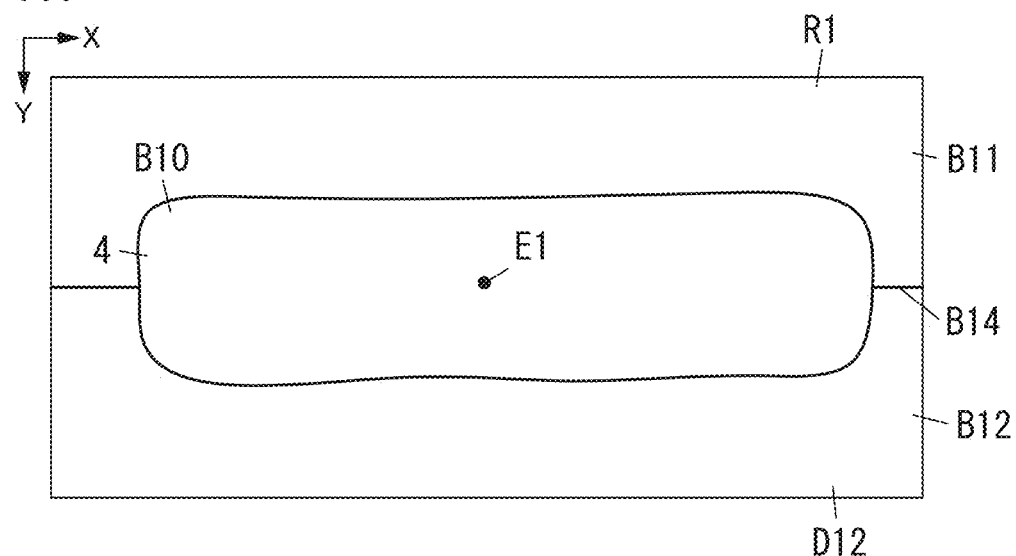
FIG. 4A illustrates how the data creation system performs deformation processing.

After having extracted the pixel region of the object 4, the deformer 11 rotates the object 4 clockwise 90 degrees around, for example, a rotational axis passing through the center E1 of the object 4 on an X-Y plane (refer to FIGS. 3C and 4A; which may be the center of gravity thereof) and intersecting at right angles with the X-Y plane (refer to FIG. 4A). Note that the location of the rotational axis, rotational direction, and rotational angle may have their settings changed in accordance with the user's command entered via the operating member 18. That is to say, the rotational direction does not have to be clockwise but may also be counterclockwise. The rotational angle does not have to be 90 degrees but may also be 30, 60, or 180 degrees, for example.

Optionally, the deformer 11 may create the second image data D12 by making, as the deformation processing, not only the rotation of the object 4 but also any other type of deformation (such as scaling up or down or flipping) as well.

The remover 12 removes the linear first feature X1 present in the first image data D11 (i.e., performs the "removal processing"). In this embodiment, the remover 12 removes the first feature X1 from the first image data D11 as an example. The remover 12 removes, from the first image data D11, the first feature X1 that has been extracted by the feature extractor 15. That is to say, after the removal processing has been performed, the deformation processing described above is performed. The deformer 11 generates the second image data D12 based on the first image data D11 from which the first feature X1 has been removed. This makes it easier to identify the first feature X1 compared to, for example, a situation where the first feature X1 is removed after the deformation.

A specific example of the removal processing will be described. The remover 12 translates, in accordance with the scan line information extracted by the feature extractor 15 (in the feature extraction processing), each scan line in a direction in which each scan line decreases its height (i.e., in the depth direction) in the first image data D11. That is to say, the remover 12 performs image processing of eliminating the height difference by equalizing the respective heights (pixel values) of the scan lines. As a result, the feature concerning the boundary between the scan lines (the first feature X1, i.e., the stripe 7) disappears (refer to FIG. 3C).

The feature assigner 14 assigns the second feature X2 to the second image data D12 (i.e., performs the "feature assignment processing"). As described above, the second feature X2 includes the linear first feature X1 present in the first image data D11. The feature assigner 14 assigns, to the second image data D12, the first feature X1 that has been extracted by the feature extractor 15 from the first image data D11 and acquired by the feature acquirer 13. That is to say, the feature assignment processing is performed after the removal processing and the deformation processing have been performed.

A specific example of the feature assignment processing will be described. The feature assigner 14 assigns, in accordance with information about the scan line height (pixel value) extracted by the feature extractor 15 (in the feature extraction processing), a plurality of stripes 7 (as the first feature X1) aligned with the X-axis to the second image data D12 including the object 4 that has been rotated (refer to FIG. 4B). In this embodiment, the dimension of the pixel region R1 including the object 4 as measured in the Y-axis direction (hereinafter referred to as a "Y-axis dimension of the pixel region R1") changes before and after the rotation. That is to say, as shown in FIGS. 3A-4B, the Y-axis dimension of the pixel region R1 after the rotation is smaller than the Y-axis dimension of the pixel region R1 before the rotation. In that case, the feature assigner 14 may use, for example, scan line information in a middle range (as indicated by the one-dot chain rectangle F1 in FIG. 3B) of the pixel region R1 in the Y-axis direction before the rotation. The region surrounded with the one-dot chain rectangle F1 in FIG. 3B has a size approximately equal to that of the pixel region R1 after the rotation. The feature assigner 14 reproduces the height (pixel value) of a plurality of scan lines in the middle range between both ends along the X-axis of the pixel region R1 after the rotation, thus making the stripes 7 (first feature X1) in the direction aligned with the X-axis reproducible.

Figure 4B:
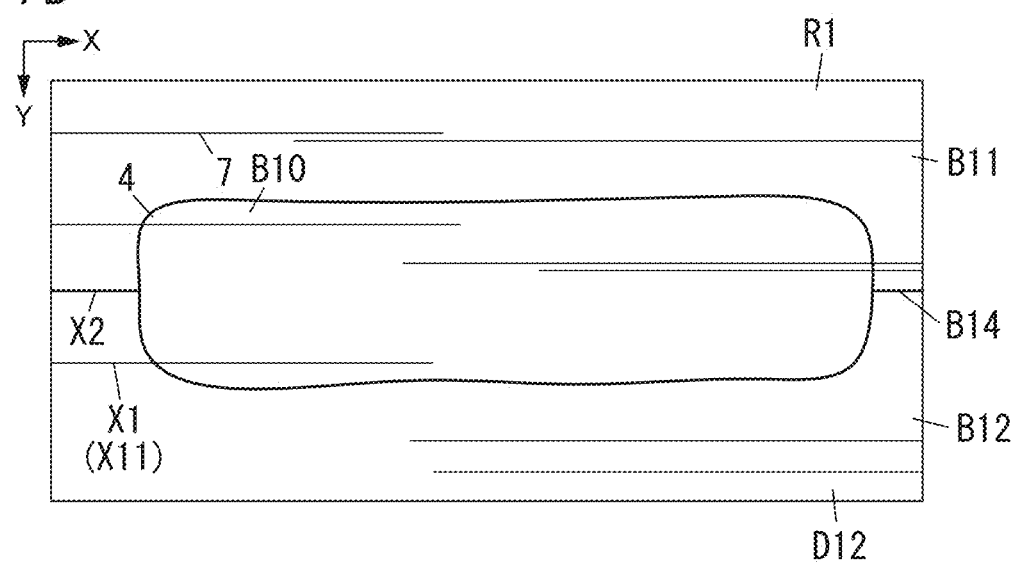
FIG. 4B illustrates how the data creation system performs feature assignment processing.

Consequently, the second image data D12 shown in FIG. 4B, which has been subjected to the feature assignment processing, is created as if the second image data D12 were image data captured by actually scanning, along the X-axis, the object 4 that is elongate in the X-axis direction.

The label attached to the second image data D12 (i.e., the particular condition of the object 4 as the object to be recognized) may be the same as the label that has been attached in advance to the first image data D11 (i.e., the particular condition of the object 4). For example, if the label of the first image data D11 (i.e., the particular condition of the object 4) is "non-defective," then the label of the second image data D12 (i.e., the particular condition of the object 4) may also be non-defective. Also, if the particular condition has been allocated to a particular region (i.e., the pixel region representing the object 4) of the first image data D11, then the same particular condition may be allocated to a particular region of the second image data D12 after the deformation. For example, if the particular condition (i.e., the type of the defect) of the particular region of the first image data D11 is sputter, then the particular condition of the particular region of the second image data D12 after the deformation may also be regarded as sputter.

Meanwhile, if the Y-axis dimension of the pixel region R1 after the rotation is larger than the Y-axis dimension of the pixel region R1 before the rotation, then the scan line information extracted from the first image data D11 may fall short in some regions. In that case, the feature assigner 14 may make interpolation for the pixels in such regions where the scan line information falls short by repeatedly using a particular scan line height (pixel value) in accordance with the scan line information extracted.

(2.3) Operation

Figure 5:
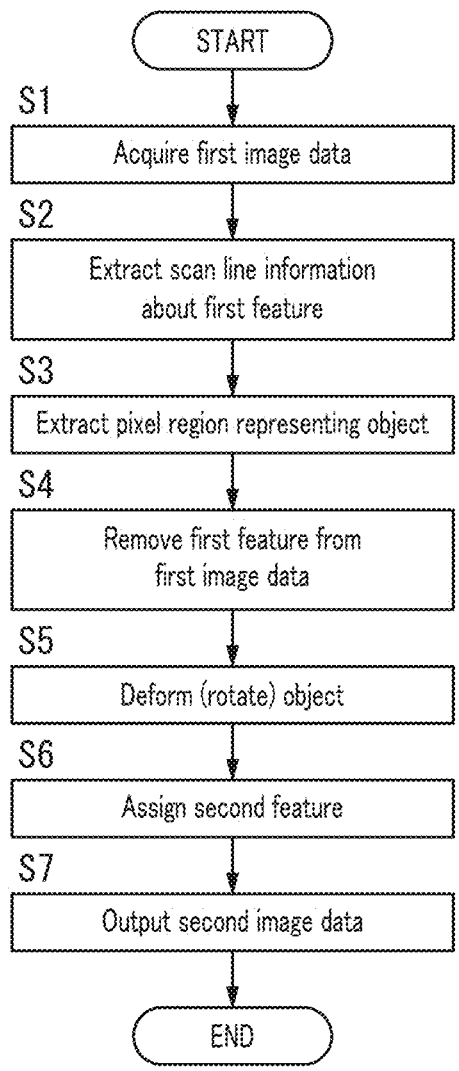
FIG. 5 is a flowchart showing a procedure of operation of the data creation system.

Next, an exemplary procedure of operation of the data creation system 1 will be described with reference to FIG. 5. Note that the procedure of operation to be described below is only an example and should not be construed as limiting.

To perform data augmentation processing, the processor 10 of the data creation system 1 acquires first image data D11 as original learning data (in S1). The first image data D11 may be, for example, data in which a bead B10 corresponding to a "defective (condition)" has been shot.

The processor 10 performs feature extraction processing to acquire (extract), as second feature X2, scan line information about a first feature X1 (stripe 7) as the second feature X2 from the first image data D11 (in S2).

The processor 10 also performs object extraction processing to acquire (extract) information about the pixel region representing the object 4 from the first image data D11 (in S3).

Next, the processor 10 performs removal processing to remove the first feature X1 from the first image data D11 (in S4).

The processor 10 further performs deformation processing to generate second image data by rotating the pixel region of the object 4 (e.g., a pixel region R1 covering the object 4 and the first and second base metals B11, B12 in this example) clockwise 90 degrees (in S5).

Then, the processor 10 performs feature assignment processing to assign, in accordance with the scan line information, the first feature X1 (stripe 7) as the second feature X2 to the pixel region R1 of the second image data D12 after the deformation (in S6).

The processor 10 outputs the second image data D12 to which the second feature X2 has been assigned (in S7). The second image data D12 is stored as learning data (image data D1) in a storage device with the same "defective" label as the original first image data D11 attached thereto.

[Advantages]

As described above, in the data creation system 1 according to this embodiment, the linear first feature X1 is removed from the image data (e.g., the first image data D11 in the example described above). This may reduce the chances of the linear first feature X1 being deformed along with the object 4 and losing its linearity, i.e., being replaced with a stripe 7 aligned with a direction (i.e., Y-axis direction) different from the X-axis, for example. Consequently, this reduces the chances of creating unreal image data such as image data which has been originally scanned along the X-axis but in which a stripe 7 aligned with a direction different from the X-axis is present.

In particular, the data creation system 1 according to this embodiment enables pseudo data creation (such as data augmentation) so that the data created is even closer to the image data generated by actually shooting the object 4 from a different direction from the first image data D11. Estimating the condition of the object 4 in the object to be recognized image data D3 by using such a learned model M1 that has been generated using such second image data D12 as learning data reduces the chances of recognizing the condition of the object 4 erroneously due to the loss of linearity of the linear first feature X1. Consequently, this contributes to reducing the chances of causing a decline in the performance of recognizing the object 4.

In addition, removing the linear first feature X1 enables preparing a wide variety of learning data by assigning the second feature X2 while reducing the loss of its linearity.

Furthermore, in the data creation system 1 according to this embodiment, the second feature X2 includes the linear first feature X1 present in the first image data D11. This enables pseudo data creation (such as data augmentation) so that the data created is even closer to image data that can exist in the real world compared to, for example, a situation where the second feature X2 is acquired from another image data.

Furthermore, in this embodiment, the first feature X1 includes the straight feature X11, which is a feature (stripe 7) concerning the boundary between a plurality of scan lines on the first image data D11 depending on the line sensor camera 6 that has shot the object 4. This may reduce the chances of the data created being significantly different from image data that can exist in the real world due to deformation of the feature concerning the boundary between the plurality of scan lines.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Also, the functions of the data creation system 1 according to the exemplary embodiment described above may also be implemented as, for example, a data creation method, a computer program, or a non-transitory storage medium on which the computer program is stored.

Next, variations of the exemplary embodiment will be enumerated one after another. Note that the variations to be described below may be adopted in combination as appropriate. In the following description, the exemplary embodiment described above will be hereinafter sometimes referred to as a "basic example."

The data creation system 1 according to the present disclosure includes a computer system. The computer system may include a processor and a memory as principal hardware components thereof. The functions of the data creation system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the data creation system 1 are aggregated together in a single housing. However, this is not an essential configuration. Alternatively, those constituent elements of the data creation system 1 may be distributed in multiple different housings, for example.

Conversely, the plurality of functions of the data creation system 1 may be aggregated together in a single housing. Still alternatively, at least some functions of the data creation system 1 (e.g., some functions of the data creation system 1) may be implemented as a cloud computing system as well.

(3.1) First Variation

Figure 6:
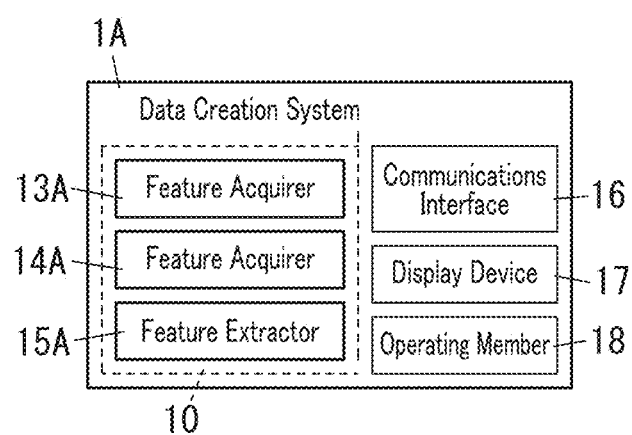
FIG. 6 is a block diagram illustrating a schematic configuration for a first variation of the data creation system.
Figure 7:
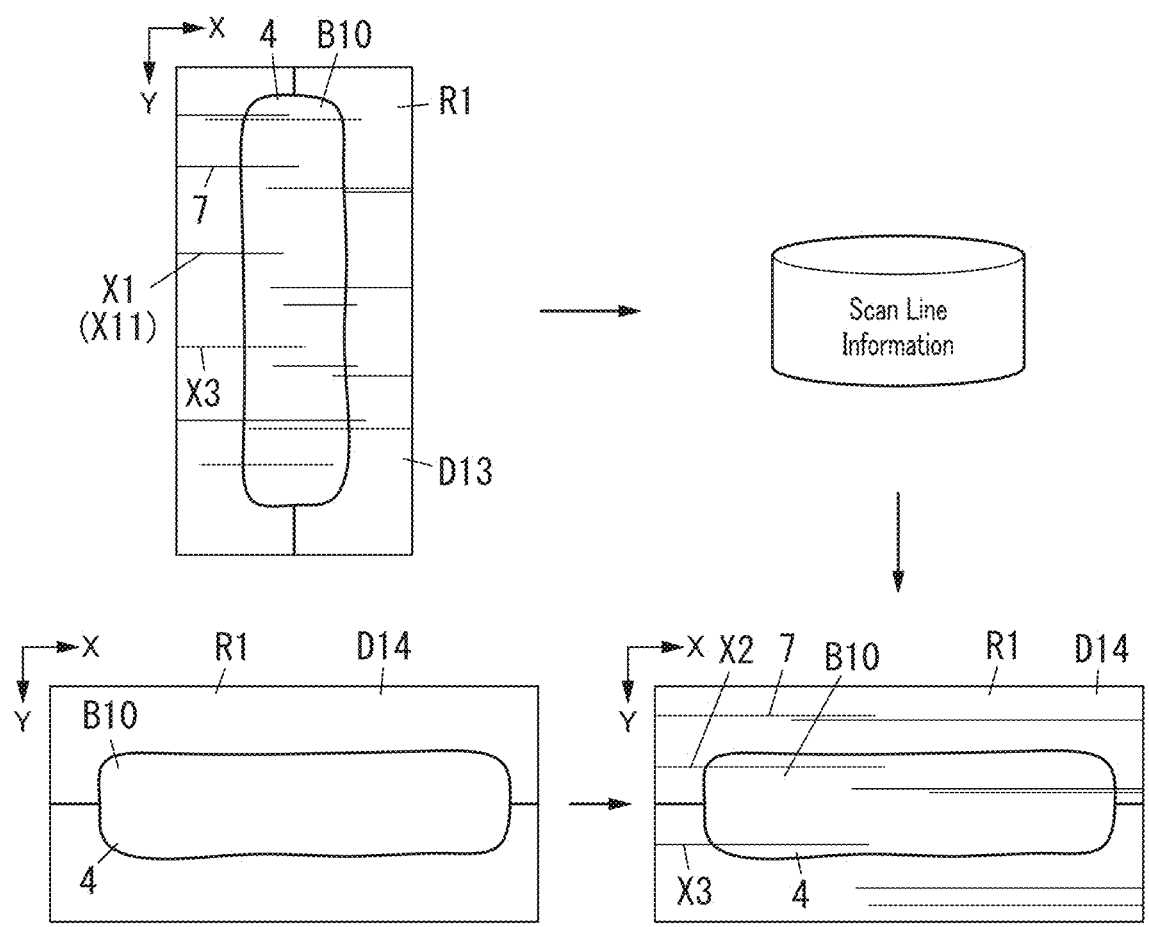
FIG. 7 is a conceptual diagram illustrating the first variation.

Next, a first variation of the present disclosure will be described with reference to FIGS. 6 and 7. In the following description, any constituent element, having substantially the same function as a counterpart of the data creation system 1 according to the basic example described above, will be designated by the same reference numeral as that counterpart's, and description thereof will be omitted herein as appropriate.

In the basic example described above, a feature (stripe 7) concerning the boundary between scan lines and corresponding to the linear first feature X1 is present in the original image data (first image data D11). In this variation, no such stripes 7 involved with the scan lines are present in the original image data (fourth image data D14; refer to FIG. 7), which is a difference from the basic example.

Specifically, the data creation system 1A according to this variation includes a feature acquirer 13A, a feature assigner 14A, and a feature extractor 15A. The respective functions of the feature acquirer 13A, the feature assigner 14A, and the feature extractor 15A are provided for the processor 10. In addition, unlike the processor 10 of the basic example, the respective functions of the deformer 11 and the remover 12 are omitted from the processor 10 according to this variation. Unlike the basic example, the data creation system 1A acquires two image data items (namely, third image data D13 and the fourth image data D14) as input image data.

The feature acquirer 13A acquires a linear feature. In this example, the linear feature is a feature (third feature X3, stripe 7) concerning the boundary between a plurality of scan lines depending on the line sensor camera 6 that shoots the object 4. In this variation, the third feature X3 is present in the third image data D13. The third feature X3 is extracted by the feature extractor 15A. The feature extractor 15A extracts, from the third image data D13 thus input, information about the scan line height (pixel value) (scan line information) as the third feature X3. The feature acquirer 13A acquires, as the linear feature, the third feature X3 that has been extracted by the feature extractor 15A.

The third image data D13 may be, for example, image data that has been actually shot with the line sensor camera 6 and includes a pixel region R1 representing the object 4 (e.g., the bead B10 as in the basic example). In addition, the third image data D13 includes a plurality of linear features (third feature X3) corresponding to the first feature X1 (straight feature X11) concerning the stripe 7 in the basic example.

In the third image data D13, as in the first image data D11 of the basic example, the longitudinal axis of the object 4 is aligned with the Y-axis and the scan lines are aligned with the X-axis. Thus, the stripes 7 (third feature X3) are aligned with the X-axis.

On the other hand, the fourth image data D14 may be, for example, a CG image in which the object 4 (e.g., the bead B10 as in the basic example) and base materials (e.g., the first and second base metals B11, B12) are rendered. Optionally, the fourth image data D14 may also be created by padding an actually captured image as a part thereof. Note that the fourth image data D14 is data in which no stripes 7 involved with the scan lines are present as described above.

In this variation, in the fourth image data D14, the longitudinal axis of the object 4 is aligned with the X-axis as in the second image data D12 of the basic example. That is to say, the fourth image data D14 is image data as if the third image data D13 were rotated clockwise 90 degrees except that there are no stripes 7 (third feature X3) in the fourth image data D14.

The feature assigner 14A assigns a linear feature (third feature X3) to image data including the pixel region R1 representing the object 4 (i.e., the fourth image data D14). The feature assigner 14A assigns, in accordance with the scan line information extracted by the feature acquirer 13A, a plurality of stripes 7 (as the third feature X3) aligned with the X-axis to the fourth image data D14. In this variation, the Y-axis dimension of the pixel region R1 of the fourth image data D14 is smaller than the Y-axis dimension of the pixel region R1 of the third image data D13. Thus, as in the basic example, the feature assigner 14A uses, for example, scan line information in a middle range of the pixel region R1 of the third image data D13 in the Y-axis direction. The feature assigner 14A reproduces the height (pixel value) of a plurality of scan lines in the middle range between both ends along the X-axis of the pixel region R1 of the fourth image data D14, thus making the stripes 7 (third feature X3) in the direction aligned with the X-axis reproducible.

According to this variation, the linear feature (third feature X3) concerning the boundary between the plurality of scan lines is assigned to the image data (fourth image data D14). This enables pseudo data creation (such as data augmentation) so that the data created is closer to image data that can exist in the real world as in the basic example described above. Consequently, this contributes to reducing the chances of causing a decline in the performance of recognizing the object 4.

Note that the "scan line information" acquired by the feature acquirer 13A and assigned by the feature assigner 14A does not have to be the third feature X3 itself extracted by the feature extractor 15A. Alternatively, the "scan line information" may also be, for example, the average and variance of the respective heights of the scan lines. Still alternatively, the scan line information may also be information about a set of differences, each of which is a difference between each point (pixel) on a scan line of interest and the value of a pixel adjacent to the former pixel in a direction different from the scan line. Yet alternatively, the "scan line information" may also be the average and variance of the differences. If the "scan line information" is reproduced as the difference in average scan line height, then the recess or projection in a portion to which the scan line is added will be flattened. On the other hand, this variation enables reproducing subtle unevenness even in the recess or projection of the scan line portion. If the image data is luminance image data, this enables reproducing a subtle color variation in the scan line.

The functions of the data creation system 1A according to this variation may also be implemented as, for example, a data creation method, a computer program, or a non-transitory storage medium on which the computer program is stored. Specifically, a data creation method according to this variation is a method for creating image data (fourth image data D14) for use as learning data to generate a learned model M1 about an object 4. The data creation method includes a feature acquiring step and a feature assigning step. The feature acquiring step includes acquiring a linear feature (such as the third feature X3). The feature assigning step includes assigning the linear feature (third feature X3) to the image data (fourth image data D14) including a pixel region R1 representing the object 4.

(3.2) Second Variation

Next, a second variation of the present disclosure will be described with reference to FIG. 8-9B. In the following description, any constituent element, having substantially the same function as a counterpart of the data creation system 1 according to the basic example described above, will be designated by the same reference numeral as that counterpart's, and description thereof will be omitted herein as appropriate.

In the basic example described above, the deformation caused by the deformer 11 to the object 4 is rotation. However, the deformation about the object 4 does not have to be rotation. Alternatively, the deformation about the object 4 may include deformation of the shape (such as contour) of the object 4. Specifically, the deformation about the object 4 may include, instead of, or in addition to, rotation, the deformation of the shape (such as contour) of the object 4 (which is at least one of translation, scaling up, or scaling down), for example.

In this variation, the deformation about the object 4 is the deformation of the shape of the object 4 as will be described below. The following description will be focused on only the deformation processing performed by the deformer 11.

Figure 8:
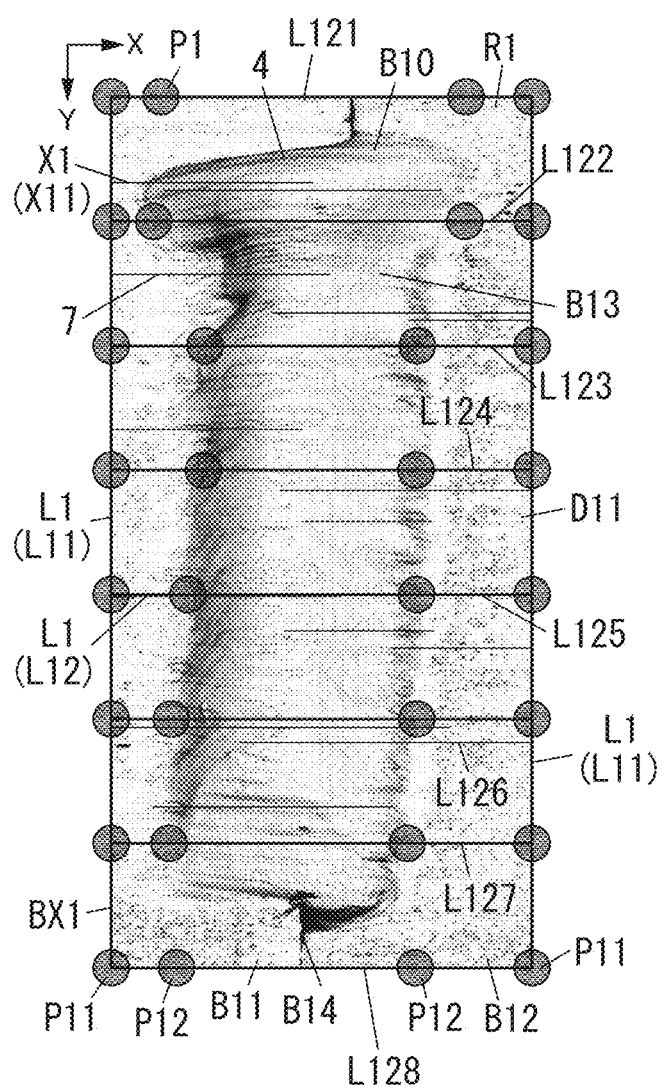
FIG. 8 illustrates how a second variation of the data creation system performs deformation processing.

For example, the deformer 11 may be configured to set a plurality of virtual lines L1 (straight lines) and a plurality of reference points P1 on the first image data D11 as shown in FIG. 8 and then cause the following two types of deformations (hereinafter referred to as a first deformation and a second deformation, respectively). Specifically, the deformer 11 sets the plurality of reference points P1 on the virtual lines (i.e., second lines L12 to be described later) and moves at least one reference point P1 out of the plurality of reference points P1, thereby deforming the shape of the object 4.

The plurality of virtual lines L1 includes a pair of first lines L11 each of which is parallel to the Y-axis, and eight second lines L12, each of which is parallel to the X-axis. The deformer 11 sets the eight second lines L12 such that those second lines L12 are arranged at regular intervals along the Y-axis. Note that the number of the virtual lines L1 is not limited to any particular number. The interval between two second lines L12 which are adjacent to each other in the Y-axis direction may be set in advance in a storage device (e.g., the memory of the processor 10) or changed in accordance with the user's command entered via the operating member 18, whichever is appropriate. Optionally, the number of the second lines L12 may be changed in response to the change of the interval setting. In the following description, the eight second lines L12 will be hereinafter sometimes referred to as second lines L121-L128, respectively, from top to bottom of FIG. 8 for the sake of convenience of description.

The deformer 11 according to this variation sets, in accordance with the straight feature X11, the direction of the eight second lines L12 to align the direction of the second lines L12 with the direction of the stripes 7 (e.g., direction aligned with the X-axis in this case).

In this variation, the deformer 11 sets the direction of the virtual lines L1 such that the bead B10 is surrounded with the pair of first lines L11 and two second lines L121, L128 at both ends in the Y-axis direction out of the eight second lines L12. In the following description, the rectangular frame defined by the pair of first lines L11 and the two second lines L121, L128 will be hereinafter referred to as a "bounding box BX1" (refer to FIG. 8). The deformer 11 determines, based on a difference in pixel value, the contour shape (pixel region) of the bead B10. The deformer 11 defines the pixel region of the bead B10 by, for example, image processing such as edge detection processing. Then, the deformer 11 defines the bounding box BX1 such that the second lines L12 not only are aligned with the direction of the stripes 7 but also surround the bead B10 in its entirety (refer to FIG. 8).

The plurality of reference points P1 includes sixteen first points P11, which are set at respective intersections between the pair of first lines L11 and the eight second lines L12, and sixteen second points P12, which are set at respective intersections between the eight second lines L12 and the contour of the bead B10. Strictly speaking, there is no intersection between the second line L121 and the contour of the bead B10, and therefore, the second points P12 of the second line L121 are set at the same locations in the X-axis direction as the second points P12 of the second line L122. Likewise, there is no intersection between the second line L128 and the contour of the bead B10, and therefore, the second points P12 of the second line L128 are set at the same locations in the X-axis direction as the second points P12 of the second line L127.

In this variation, the deformer 11 may perform the deformation processing to, for example, prevent the contour of the bead B10 from overreaching the bounding box BX1 thus defined.

Figure 9A:
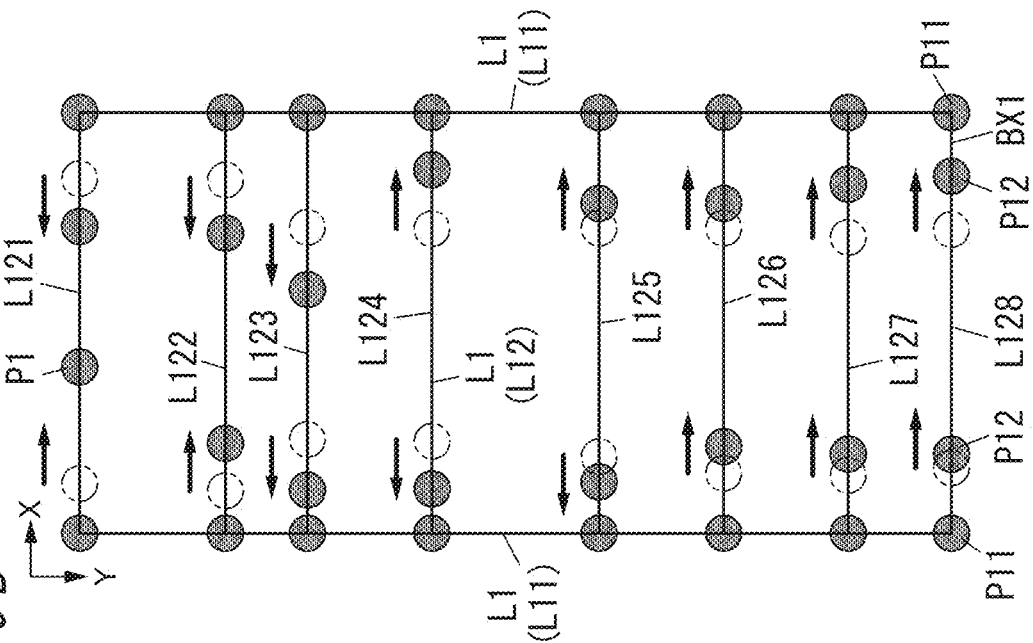
FIG. 9A illustrates a first deformation in the deformation processing according to the second variation.

The first deformation is expansion or contraction to either increase or decrease the distance between two adjacent second lines L12 as shown in FIG. 9A. In the example shown in FIG. 9A, the deformer 11 deforms the object 4 to make the distance between the second lines L121, L122 longer than the one shown in FIG. 8, i.e., to expand a region, falling within the range between the second lines L121 and L122, of the object 4 along the Y-axis. When expanding (or extending) that region of the object 4, the deformer 11 makes pixel interpolation as appropriate by linear interpolation, for example. In this case, the second line L122 moves, along with the four reference points P1 on the second line L122, toward the positive side of the Y-axis (i.e., moves downward). In addition, in the example shown in FIG. 9A, the deformer 11 makes the distance between the second lines L122 and L123 shorter than the one shown in FIG. 8. That is to say, the deformer 11 deforms the object 4 such that the region, falling within the range between the second lines L122, L123, of the object 4 contracts along the Y-axis. In this case, the second line L123 moves, along with the four reference points P1 on the second line L123, toward the negative side of the Y-axis (i.e., moves upward).

As for the other second lines L12, in the example shown in FIG. 9A, the second line L124 moves, along with the four reference points P1 on the line L124, toward the negative side of the Y-axis (i.e., moves upward). Each of the other second lines L125, L126, and L127 moves, along with the four reference points P1 on the line, toward the positive side of the Y-axis (i.e., moves downward).

The parameters specifying the exact degree of expansion or contraction to apply may be set in advance in a storage device (such as the memory of the processor 10), automatically set at random by the processor 10, or set in accordance with the user's command entered via the operating member 18, whichever is appropriate.

Figure 9B:
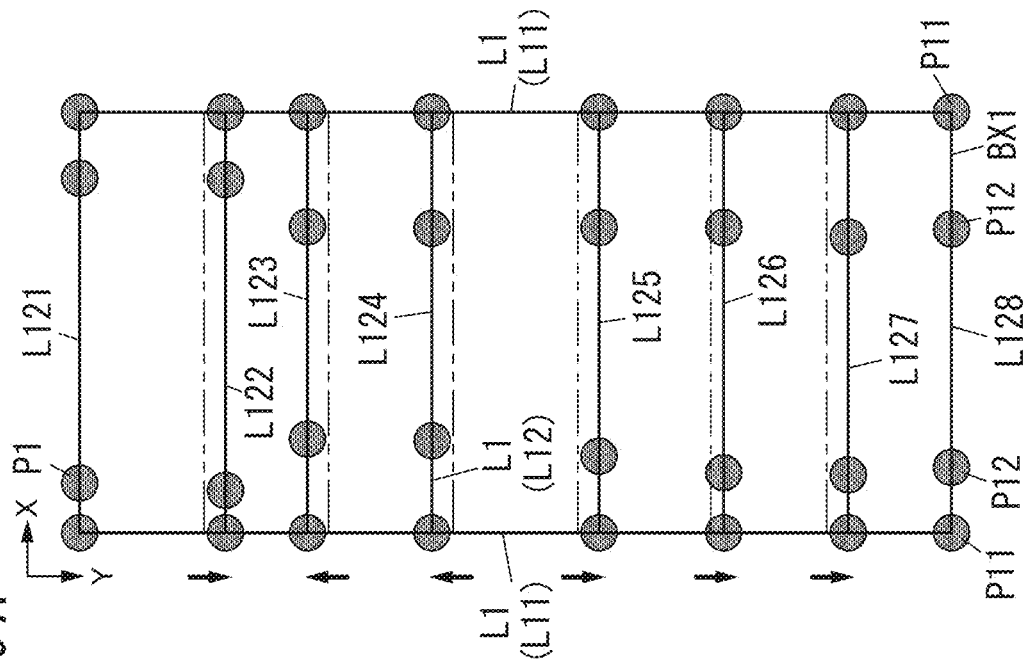
FIG. 9B illustrates a second deformation in the deformation processing according to the second variation.

The second deformation is caused by moving at least one reference point P1 (e.g., two second points P12 to be set at the intersections with the contour of the bead B10 in this example) out of the four reference points P1 on each second line L12 along the second line L12 as shown in FIG. 9B. That is to say, the deformer 11 generates second image data D12 by deforming the shape of the object 4 along one or more virtual lines (e.g., the second lines L12) aligned with the linear first feature X1 (e.g., the straight feature X11 in this example). The second deformation is caused by performing, for example, two-dimensional projective transformation on the seven rectangular regions formed by the pair of first lines L11 and the eight second lines L12 and thereby transforming each of those seven rectangular regions into a trapezoidal region.

In the example shown in FIG. 9B, the deformer 11 deforms the object 4 such that the two second points P12 on each of the second lines L121, L122 move toward each other, i.e., a region, falling within the range between those two second points P12, of the object 4 contracts along the X-axis.

Also, in the example shown in FIG. 9B, the deformer 11 deforms the object 4 such that the two second points P12 on the second line L123 each move toward the negative side of the X-axis, i.e., a region, falling within the range between those two second points P12, of the object 4 moves toward the negative side of the X-axis.

Furthermore, in the example shown in FIG. 9B, the deformer 11 deforms the object 4 such that the two second points P12 on each of the second lines L124, L125 move away from each other, i.e., a region, falling within the range between those two second points P12, of the object 4 expands along the X-axis.

Furthermore, in the example shown in FIG. 9B, the deformer 11 deforms the object 4 such that the two second points P12 on each of the second lines L126-L128 each move toward the positive side of the X-axis, i.e., a region, falling within the range between those two second points P12, of the object 4 moves toward the positive side of the X-axis.

The magnitude of movement of each reference point P1 (second point P12) on the second line L12 may be set in advance in a storage device (such as the memory of the processor 10), automatically set at random by the processor 10, or set in accordance with the user's command entered via the operating member 18, whichever is appropriate. An upper limit value (e.g., 50% of the length of the second line L12) is preferably set with respect to the magnitude of movement.

In this variation, the deformer 11 moves at least one reference point P1 while maintaining the order of arrangement of the plurality of reference points P1 set on each virtual line (second line L12). That is to say, the deformer 11 moves the reference point(s) P1 to prevent one of the two second points P12 on a second line L12 from moving beyond the other second point P12 to the opposite side or moving beyond the first point P11 to the opposite side, for example. Deforming the object 4 while maintaining the order of arrangement of the plurality of reference points P1 reduces the chances of the second image data D12 becoming significantly different from image data that can exist in the real world.

In this variation, the deformer 11 is supposed to cause both the first deformation and the second deformation.

However, this is only an example and should not be construed as limiting. Alternatively, the deformer 11 may cause only one of the first deformation or the second deformation. Furthermore, in the variation described above, the deformer 11 is supposed to cause the first deformation and the second deformation in this order. However, these two types of processing may be performed in a different order. That is to say, the second deformation may be caused first, and then the first deformation may be caused. The data creation system 1 preferably allows the user to enter a command, via the operating member 15, for example, specifying, not only either the first deformation or the second deformation is to be caused or both the first deformation and the second deformation are to be caused, but the order in which at least one of these two types of processing is performed.

Optionally, the deformer 11 may create the second image data D12 by performing additional image processing such as rotation or flipping as in the basic example, besides at least one of the first deformation or the second deformation.

In the example described above, the plurality of second points P12 are set at the respective intersections between the respective second lines L12 and the contour of the bead B10. However, this is only an example and should not be construed as limiting. Alternatively, the plurality of second points P12 may also be set at regular intervals on each second line L12. The predetermined interval may be specified by the user.

(3.3) Third Variation

In the data creation system 1, the processing device including the feature extractor 15 and the processing device including the feature assigner 14 may be two different devices. For example, in the data creation system 1, the processing device (hereinafter referred to as a "first processing device") 110 including the feature extractor 15 and the processing device (hereinafter referred to as a "second processing device") 120 that performs the rest of the processing may be two different devices.

Figure 10:
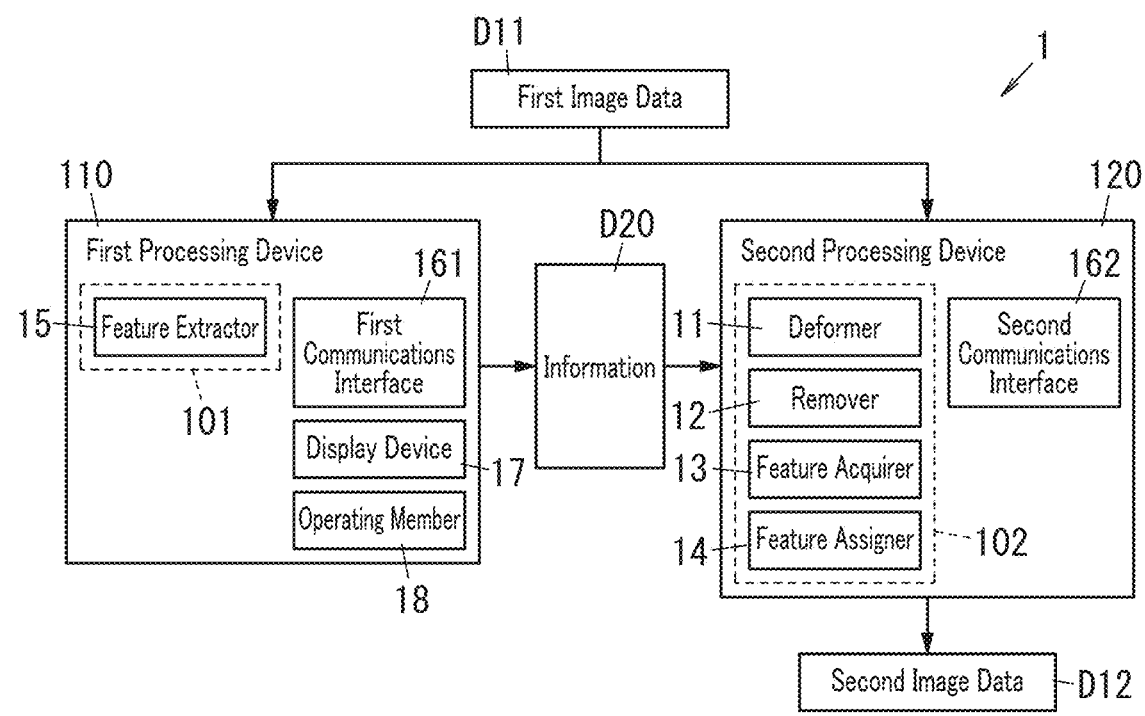
FIG. 10 is a block diagram illustrating a schematic configuration for a third variation of the data creation system.

For example, as shown in FIG. 10, the first processing device 110 includes a processor (hereinafter referred to as a "first processor") 101, a communications interface (hereinafter referred to as a "first communications interface") 161, the display device 17, and the operating member 18. The first processor 101 of the first processing device 110 includes the feature extractor 15.

The first communications interface 161 receives, from the line sensor camera 6, the first image data D11 as original learning data.

The feature extractor 15 extracts the linear first feature X1 from the first image data D11.

The first communications interface 161 (transmitter) outputs (transmits) the information D20 representing the first feature X1, extracted by the feature extractor 15, to the second processing device 120.

The second processing device 120 includes a processor (hereinafter referred to as a "second processor") 102 and a communications interface (hereinafter referred to as a "second communications interface") 162. The second processor 102 of the second processing device 120 includes the deformer 11, the remover 12, the feature acquirer 13, and the feature assigner 14.

The second communications interface 162 receives the first image data D11 from the line sensor camera 6.

The second communications interface 162 (receiver) receives the information D20 representing the first feature X1.

The feature acquirer 13 acquires, as the second feature X2, the first feature X1 included in the information D20.

That is to say, the feature acquirer 13 acquires, as the second feature X2, the first feature X1 that has been extracted by the feature extractor 15 of the first processing device 110 and transmitted from the first processing device 110.

The remover 12 removes the linear first feature X1 present in the first image data D11. The deformer 11 generates, based on the first image data D11, the second image data D12 by causing deformation about the object 4 to the first image data D11. The feature assigner 14 assigns the second feature X2 acquired by the feature acquirer 13 to the second image data D12.

The second processing device 120 may make, for example, the second communications interface 162 transmit the image data thus generated (i.e., the second image data D12 to which the second feature X2 is assigned) to the first processing device 110. In that case, the user may make the learning system 2 generate the learned model M1 using the image data thus received. This learned model M1 outputs, in response to image data created by assigning the second feature X2 to the second image data D12, an estimation result similar to a situation where the first image data D11 is subjected to the estimation made about the particular condition of the object 4. The second image data D12 has been generated by removing the first feature X1 from the first image data D11 and causing deformation about the object 4 to the first image data D11.

The second processing device 120 may transmit the image data thus generated to an external server including a learning system. The learning system of the external server generates a learned model M1 using a learning data set including learning data as the image data (i.e., the second image data D12 to which the second feature X2 is assigned). This learned model M1 outputs, in response to image data created by assigning the second feature X2 to the second image data D12, an estimation result similar to a situation where the first image data D11 is subjected to the estimation made about the particular condition of the object 4. The second image data D12 has been generated by removing the first feature X1 from the first image data D11 and causing deformation about the object 4 to the first image data D11. The user may receive the learned model M1 thus generated from the external server.

The label attached to the second image data D12 may be the same as the one attached to the first image data D11. Thus, making sufficient learning may make the learned model M1 a model that outputs, in response to image data created by assigning the second feature to the second image data D12, an estimation result similar to a situation where the first image data D11 is subjected to the estimation made about the particular condition of the object 4.

(3.4) Other Variations

Next, other variations will be enumerated one after another.

The "image data" as used herein does not have to be image data acquired by an image sensor but may also be two-dimensional data such as a CG image or two-dimensional data formed by arranging multiple items of one-dimensional data acquired by a distance image sensor as already described for the basic example. Alternatively, the "image data" may also be three- or higher dimensional image data. Furthermore, the "pixels" as used herein do not have to be pixels of an image captured actually with an image sensor but may also be respective elements of two-dimensional data.

In the basic example described above, the first image data D11 is image data captured by making the line sensor camera 6 scan the object 4 (e.g., the bead B10) through feed control performed by an articulated robot. Alternatively, the first image data D11 may also be image data captured by making an image capture device scan the object 4 put on a stage (such as an examining table) being moved.

Also, in the basic example described above, the first image data D11 is image data captured actually with an image capture device (line sensor camera 6). However, this is only an example and should not be construed as limiting. Alternatively, the first image data D11 may also be CG image data in which the stripes 7 involved with scan lines are rendered schematically.

Furthermore, in the basic example described above, the straight feature X11 is a feature (e.g., stripes 7) concerning the boundary between the scan lines. Alternatively, the straight feature X11 may also be a linear scratch left on the surface of a metallic plate, for example.

In the basic example described above, the straight feature X11 is individual straight lines (stripes 7). However, this is only an example and should not be construed as limiting. Alternatively, the straight feature X11 may also be a polygon (such as a triangle or a quadrangle) formed of a plurality of straight lines or even a pattern formed of multiple polygons.

In the basic example described above, the linear first feature X1 is the straight feature X11. However, this is only an example and should not be construed as limiting. Alternatively, the linear first feature X1 may also be a curvilinear feature or a single curve. Still alternatively, the linear first feature X1 may be a circle, an ellipse, or a pattern formed of multiple circles or ellipses. In that case, the feature acquirer 13 acquires information about, for example, the center positions of concentric circles. The center positions of concentric circles may be set in accordance with a command entered by the user via the operating member 18, for example. Alternatively, the processor 10 may automatically extract, by Hough transform, a circle from the image data captured. Alternatively, the linear first feature X1 may also be a strip feature having at least a predetermined width.

Optionally, the linear first feature X1 may also be a pattern as a mixture of a straight feature and a curvilinear feature.

A specific example of directly specifying a pattern as a straight or curvilinear feature will be described. First, the user selects two points included in a pattern element using a mouse pointer and specifies the two points by clicking the mouse. The feature acquirer 13 calculates a straight line or curve passing through the two points thus specified and superimposes the straight line or curve thus calculated on the first image data D11. The display device 17 displays the first image data D11 on which the straight line or curve is superimposed and an end button. The user checks the straight line or curve displayed and, when there is no problem, selects the end button using the mouse pointer and clicks the mouse. The feature acquirer 13 acquires information representing the straight line or curve thus calculated as the feature information. On the other hand, if there is a difference between the straight line or curve calculated and the pattern element, then the user further specifies a third point included in the pattern element. The feature acquirer 13 calculates a straight line or curve passing through the three points thus specified and superimposes the straight line or curve thus calculated on the first image data D11. The display device 17 displays the first image data D11 on which the straight line or curve is superimposed and an end button. The user checks the straight line or curve displayed and, when there is no problem, selects the end button and clicks the mouse. The feature acquirer 13 acquires information representing the straight line or curve thus calculated as the feature information. On the other hand, if there is a difference between the straight line or curve calculated and the pattern element, then the user will further specify fourth, fifth, . . . and $N^{th}$ points included in the pattern element and the feature acquirer 13 will calculate respective straight lines or curves in the same way after that. Optionally, the straight line or curve passing through N points thus specified may be calculated by, for example, an $N^{th}$-degree equation, a Bezier curve, or a spline curve. Alternatively, the display device 17 may also be configured to, when the user has specified only one point included in the pattern element, display a straight line or curve passing through the point. The feature acquirer 13 stores the feature information in the memory of the processor 10, for example Optionally, the feature acquirer 13 may have the function of storing information to specify the pattern element in the memory of the processor 10 or any other storage and automatically extracting the feature information from the first image data D11 by reference to the information.

In the basic example described above, the object 4 as an object to be recognized is the welding bead B10. However, the object 4 does not have to be the bead B10. The learned model M1 does not have to be used to conduct a weld appearance test to determine whether welding has been done properly.

In the basic example described above, the second feature X2 is the linear first feature X1 present in the first image data D11. However, this is only an example and should not be construed as limiting. Alternatively, the second feature X2 may include a third feature X3 present in additional image data (e.g., the third image data D13 according to the first variation) other than the first image data D11. In that case, the feature acquirer 13 acquires, as the second feature X2, the third feature X3 from the additional image data. For example, the feature assigner 14 may assign, as the second feature X2, both the first feature X1 present in the first image data D11 and the third feature X3 acquired from the additional image data to the second image data D12. This enables creating a wider variety of data (by data augmentation, for example) so that the data thus created is even closer to image data that can exist in the real world.

The second feature X2 may include a nonlinear feature. For example, the second feature X2 may include a feature representing a defective region such as undercut, pit, or sputter.

In the basic example described above, the first image data D11 is captured with the distance image sensor and includes information about a pixel value corresponding to the height of the scan line (as measured in a direction perpendicular to the X-Y plane). Thus, in the basic example, the feature acquirer 13 acquires the information about the height of the scan line (i.e., the scan line information) as a "pixel value" from the first image data D11. However, the feature acquirer 13 does not have to acquire the scan line information from the first image data D11 (i.e., acquire from the feature extractor 15). Alternatively, the feature acquirer 13 may acquire, as at least a part of the scan line information, various types of data from a location sensor provided for a carrier for carrying the object 4, the line sensor camera 6, an articulated robot, or a controller for controlling the articulated robot, for example. The feature acquirer 13 may calculate the height of the scan line based on the various types of data.

The stripes 7 involved with the scan lines may be produced in varying manners depending on the type of the line sensor camera 6 or the articulated robot, for example. Thus, part of the scan line information may be already known to the user who owns the line sensor camera 6 or the articulated robot, for example. In that case, the user may pre-enter the known information into the data creation system 1 via the operating member 18, for example. The data creation system 1 stores the known information in the memory of the processor 10, for example. The feature acquirer 13 may acquire the known information as at least a part of the scan line information.

Optionally, the data creation system 1 may store the scan line information acquired when creating the second image data D12 once and may use the information as the known information when creating the second image data D12 next time and on. For example, the scan line information acquired when second image data D12 is created based on first image data D11 representing one type of defective condition may be reused when second image data D12 is created based on first image data D11 representing a different type of defective condition.

In the basic example described above, the removal processing, the deformation processing, and the feature assignment processing are performed in this order. However, this is only an example and should not be construed as limiting. Alternatively, the deformation processing, the removal processing, and the feature assignment processing may be performed in this order with the removal processing and the deformation processing performed in reverse order. That is to say, the remover 12 may remove the first feature X1 subjected to the deformation processing from the second image data D12. In that case, the feature assigner 14 assigns the first feature X1 that the feature acquirer 13 has acquired from the first image data D11 to the second image data D12 from which the first feature X1 has been removed. For example, in the case of the basic example, if the first image data D11 shown in FIG. 3B is rotated 90 degrees, the second image data D12 is created with the direction of the great many straight stripes 7 changed from the direction aligned with the X-axis into the direction aligned with the Y-axis. For example, the user checks, with the naked eye, the second image data D12 displayed on the screen by the display device 17 to determine the direction, locations, and other parameters of the great many straight stripes 7 after the deformation (rotation). Then, the user enters an operating command to specify the direction of the stripes 7 using the operating member 18. As a result, feature information about the first feature X1 after the deformation (rotation) is entered into the data creation system 1 and the remover 12 removes, in accordance with the scan line information, the first feature X1 subjected to the deformation from the second image data D12.

Performing the removal processing after the deformation processing in this manner allows the second image data D12 including the first feature X1 subjected to the deformation to be used more easily than in a situation where the first feature X1 is removed before the deformation processing. This makes it easier for the user to confirm, for example, how the first feature X1 has changed through the deformation processing.

Furthermore, in the basic example described above, the remover 12 erases the feature (first feature X1, i.e., stripes 7) concerning the boundary between the scan lines by performing image processing including equalizing the scan line heights (pixel values) in the first image data D11 and eliminating the difference between the heights. However, this is only an example and should not be construed as limiting. Alternatively, the remover 12 may also erase the stripes 7 by, for example, replacing the pixel value in the boundary between the scan lines with the average of pixel values of surrounding pixels.

The evaluation system 100 may include only some of the constituent elements of the data creation system 1. For example, the evaluation system 100 may include only the first processing device 110, out of the first processing device 110 and the second processing device 120 (refer to FIG. 10) of the data creation system 1, and the estimation system 3 (refer to FIG. 1). The functions of the first processing device 110 and the functions of the estimation system 3 may be provided for a single device. The evaluation system 100 may further include a learning system 2 (refer to FIG. 1) for generating the learned model M1. The functions of the first processing device 110, the functions of the learning system 2, and the functions of the estimation system 3 may be provided for a single device.

(4) Recapitulation

As can be seen from the foregoing description, a data creation system (1) according to a first aspect creates, based on first image data (D11), second image data (D12) for use as learning data to generate a learned model (M1) about an object (4). The data creation system (1) includes a deformer (11), a remover (12), a feature acquirer (13), and a feature assigner (14). The deformer (11) generates, based on the first image data (D11) including a pixel region (R1) representing the object (4), the second image data (D12) by causing deformation about the object (4) to the first image data (D11). The remover (12) removes a linear first feature (X1) present in the first image data (D11). The feature acquirer (13) acquires a second feature (X2). The feature assigner (14) assigns the second feature (X2) to the second image data (D12).

This aspect may reduce the chances of creating unreal image data that would be generated if the linear first feature (X1) subjected to deformation remained in the second image data (D12). Consequently, this contributes to reducing the chances of causing a decline in the performance of recognizing the object (4).

In a data creation system (1) according to a second aspect, which may be implemented in conjunction with the first aspect, the second feature (X2) includes the linear first feature (X1) present in the first image data (D11). The feature acquirer (13) acquires, as the second feature (X2), the first feature (X1) from the first image data (D11).

This aspect enables pseudo data creation (such as data augmentation) so that the data created is closer to image data that can exist in the real world, compared to acquiring the second feature (X2) from another image data, for example.

In a data creation system (1) according to a third aspect, which may be implemented in conjunction with the second aspect, the remover (12) removes the first feature (X1) from the first image data (D11). The deformer (11) generates the second image data (D12) based on the first image data (D11) from which the first feature (X1) has been removed. The feature assigner (14) assigns, to the second image data (D12), the first feature (X1) that the feature acquirer (13) has acquired from the first image data (D11).

This aspect makes it easier to identify the first feature (X1) compared to removing the first feature (X1) after the deformation, for example.

In a data creation system (1) according to a fourth aspect, which may be implemented in conjunction with the second aspect, the remover (12) removes the first feature (X1) subjected to the deformation from the second image data (D12). The feature assigner (14) assigns, to the second image data (D12) from which the first feature (X1) has been removed, the first feature (X1) that the feature acquirer (13) has acquired from the first image data (D11).

This aspect makes it easier to use the second image data (D12) including the first feature (X1) subjected to the deformation, compared to removing the first feature (X1) before the deformation, for example.

In a data creation system (1) according to a fifth aspect, which may be implemented in conjunction with any one of the first to fourth aspects, the second feature (X2) includes a linear third feature (X3) present in additional image data (e.g., third image data D13) other than the first image data (D11). The feature acquirer (13) acquires, as the second feature (X2), the third feature (X3) from the additional image data.

This aspect enables creating a variety of data (by data augmentation, for example) that is even closer to image data that can exist in the real world.

In a data creation system (1) according to a sixth aspect, which may be implemented in conjunction with any one of the first to fifth aspects, the linear first feature (X1) includes a straight feature (X11).

This aspect may reduce the chances of data created becoming significantly different, due to deformation of the linear first feature (X1), from image data that can exist in the real world.

In a data creation system (1) according to a seventh aspect, which may be implemented in conjunction with the sixth aspect, the straight feature (X11) concerns a boundary between a plurality of scan lines on the first image data (D11) depending on a line sensor camera (6) that has shot the object (4).

This aspect may reduce the chances of data created becoming significantly different, due to deformation of the feature concerning the boundary between the plurality of scan lines, from image data that can exist in the real world.

In a data creation system (1) according to an eighth aspect, which may be implemented in conjunction with the seventh aspect, the straight feature (X11) is a feature based on a pixel value difference corresponding to a height difference between the plurality of scan lines. The height difference may be caused, in a situation, depending on a difference in a distance from the line sensor camera (6) to the object (4).

This aspect makes it easier to acquire (extract) the straight feature (X11).

In a data creation system (1) according to a ninth aspect, which may be implemented in conjunction with any one of the first to eighth aspects, the deformation about the object (4) includes rotation of the object (4).

This aspect may reduce the chances of data created becoming significantly different, due to deformation of the linear first feature (X1) as caused by rotation of the object (4), from image data that can exist in the real world.

In a data creation system (1) according to a tenth aspect, which may be implemented in conjunction with any one of the first to ninth aspects, the deformation about the object (4) includes deformation of a shape of the object (4).

This aspect may reduce the chances of data created becoming significantly different, due to deformation of the linear first feature (X1) as caused by the deformation of the shape of the object (4), from image data that can exist in the real world.

A data creation system (1A) according to an eleventh aspect creates image data (fourth image data D14) for use as learning data to generate a learned model (M1) about an object (4). The data creation system (1A) includes a feature acquirer (13A) and a feature assigner (14A). The feature acquirer (13A) acquires a linear feature (such as a third feature X3). The feature assigner (14A) assigns the linear feature (third feature X3) to the image data (fourth image data D14) including a pixel region (R1) representing the object (4).

According to this aspect, the linear feature (such as the third feature X3) is assigned to the image data (fourth image data D14), thus enabling creating pseudo data (by data augmentation, for example) that is even closer to image data that can exist in the real world. Consequently, this contributes to reducing the chances of causing a decline in the performance of recognizing the object (4).

In a data creation system (1A) according to a twelfth aspect, which may be implemented in conjunction with the eleventh aspect, the linear feature concerns a boundary between a plurality of scan lines depending on a line sensor camera (6) that shoots the object (4).

According to this aspect, the linear feature (third feature X3) concerning the boundary between a plurality of scan lines is assigned to image data (fourth image data D14), thus enabling creating pseudo data (by data augmentation, for example) that is even closer to image data that can exist in the real world. Consequently, this contributes to reducing the chances of causing a decline in the performance of recognizing the object (4).

A learning system (2) according to a thirteenth aspect generates the learned model (M1) using a learning data set including the learning data as the image data created by the data creation system (1, 1A) according to any one of the first to twelfth aspects.

This aspect enables providing a learning system (2) contributing to reducing the chances of causing a decline in the performance of recognizing the object (4).

An estimation system (3) according to a fourteenth aspect estimates a particular condition of the object (4) as an object to be recognized using the learned model (M1) generated by the learning system (2) according to the thirteenth aspect.

This aspect enables providing an estimation system (3) contributing to reducing the chances of causing a decline in the performance of recognizing the object (4).

A data creation method according to a fifteenth aspect is a method for creating, based on first image data (D11), second image data (D12) for use as learning data to generate a learned model (M1) about an object (4). The data creation method includes a deforming step, a removing step, a feature acquiring step, and a feature assigning step. The deforming step includes generating, based on the first image data (D11) including a pixel region (R1) representing the object (4), the second image data (D12) by causing deformation about the object (4) to the first image data (D11). The removing step includes removing a linear first feature (X1) present in the first image data (D11). The feature acquiring step includes acquiring a second feature (X2). The feature assigning step includes assigning the second feature (X2) to the second image data (D12).

This aspect enables providing a data creation method contributing to reducing the chances of causing a decline in the performance of recognizing the object (4).

A data creation method according to a sixteenth aspect is a method for creating image data (fourth image data D14) for use as learning data to generate a learned model (M1) about an object (4). The data creation method includes a feature acquiring step and a feature assigning step. The feature acquiring step includes acquiring a linear feature (such as a third feature X3). The feature assigning step includes assigning the linear feature (third feature X3) to the image data (fourth image data (D14)) including a pixel region (R1) representing the object (4).

This aspect enables providing a data creation method contributing to reducing the chances of causing a decline in the performance of recognizing the object (4).

A program according to a seventeenth aspect is designed to cause one or more processors to perform the data creation method according to the fifteenth or sixteenth aspect.

This aspect enables providing a function contributing to reducing the chances of causing a decline in the performance of recognizing the object (4).

A data creation system (1) according to an eighteenth aspect, which may be implemented in conjunction with any one of the first to tenth aspects, further includes a feature extractor (15) that extracts the first feature (X1) from the first image data (D11). The feature extractor (15) is included in a first processing device (110). The feature assigner (14) is included in a second processing device (120) different from the first processing device (110). The first processing device (110) transmits information (D20) representing the first feature (X1) to the second processing device (120).

This aspect contributes to reducing the chances of causing a decline in the performance of recognizing the object (4).

A processing device according to a nineteenth aspect functions as the first processing device (110) of the data creation system (1) according to the eighteenth aspect.

A processing device according to a twentieth aspect functions as the second processing device (120) of the data creation system (1) according to the eighteenth aspect.

An evaluation system (100) according to a twenty-first aspect estimates a particular condition of an object (4). The evaluation system (100) includes a processing device (110) and an estimation system (3). The processing device (110) extracts a linear first feature (X1) present in first image data (D11) including a pixel region (R1) representing the object (4). The processing device (110) outputs information (D20) representing the first feature (X1) thus extracted. The estimation system (3) outputs, in response to image data created by assigning a second feature to second image data (D12), an estimation result similar to a situation where the first image data (D11) is subjected to estimation made about a particular condition of the object (4). The second image data (D12) is generated by removing the first feature (X1) from the first image data (D11) and causing deformation about the object (4) to the first image data (D11).

This aspect contributes to reducing the chances of causing a decline in the performance of recognizing the object (4).

In an evaluation system (100) according to a twenty-second aspect, which may be implemented in conjunction with the twenty-first aspect, the deformation about the object (4) includes at least one selected from the group consisting of rotation, flipping, translation, scaling up, and scaling down of the object (4).

This aspect contributes to reducing the chances of causing a decline in the performance of recognizing the object (4).

In an evaluation system (100) according to a twenty-third aspect, which may be implemented in conjunction with the twenty-first or twenty-second aspect, the estimation system (3) estimates the particular condition of the object (4) using a learned model (M1). The evaluation system (100) further includes a learning system (2) that generates the learned model (M1). The learned model (M1) outputs, in response to image data created by assigning a second feature (X2) to second image data (D12), an estimation result similar to a situation where the first image data (D11) is subjected to estimation made about the particular condition of the object (4). The second image data (D12) is generated by removing the first feature (X1) from the first image data (D11) and causing deformation about the object (4) to the first image data (D11).

This aspect contributes to reducing the chances of causing a decline in the performance of recognizing the object (4).

A learning system (2) according to a twenty-fourth aspect functions as the learning system (2) of the evaluation system (100) according to the twenty-third aspect.

A processing device (110) according to a twenty-fifth aspect functions as the processing device (110) of the evaluation system (100) according to any one of the twenty-first to twenty-third aspects.

An estimation system according to a twenty-sixth aspect functions as the estimation system (3) of the evaluation system (100) according to any one of the twenty-first to twenty-third aspects.

Note that the constituent elements according to the second to tenth aspects and the eighteenth aspect are not essential constituent elements for the data creation system (1) but may be omitted as appropriate. The constituent elements according to the twenty-second and twenty-third aspects are not essential constituent elements for the evaluation system (100) but may be omitted as appropriate.

REFERENCE SIGNS LIST 1, 1A Data Creation System
11 Deformer
12 Remover
13, 13A Feature Acquirer
14, 14A Feature Assigner
15 Feature Extractor
2 Learning System
3 Estimation System
4 Object
6 Line Sensor Camera
100 Evaluation System
110 First Processing Device (Processing Device)
120 Second Processing Device
D11 First Image Data
D12 Second Image Data
D20 Information (Information Representing First Feature)
M1 Learned Model
R1 Pixel Region
X1 First Feature
X11 Straight Feature
X2 Second Feature
X3 Third Feature

The invention claimed is:

1. A data creation system configured to create, based on first image data, second image data for use as learning data to generate a learned model about an object, the data creation system comprising:
 a deformer configured to generate, based on the first image data including a pixel region representing the object, the second image data by causing deformation about the object to the first image data;
 a remover configured to remove a linear first feature present in the first image data;
 a feature acquirer configured to acquire a second feature; and
 a feature assigner configured to assign the second feature to the second image data.

2. The data creation system of claim 1, wherein
 the second feature includes the linear first feature present in the first image data, and the feature acquirer is configured to acquire, as the second feature, the first feature from the first image data.

3. The data creation system of claim 2, wherein
the remover is configured to remove the first feature from the first image data,
the deformer is configured to generate the second image data based on the first image data from which the first feature has been removed, and
the feature assigner is configured to assign, to the second image data, the first feature that the feature acquirer has acquired from the first image data.

4. The data creation system of claim 2, wherein
the remover is configured to remove the first feature subjected to the deformation from the second image data, and
the feature assigner is configured to assign, to the second image data from which the first feature has been removed, the first feature that the feature acquirer has acquired from the first image data.

5. The data creation system of claim 1, wherein
the second feature includes a linear third feature present in additional image data other than the first image data, and
the feature acquirer is configured to acquire, as the second feature, the third feature from the additional image data.

6. The data creation system of claim 1, wherein
the linear first feature includes a straight feature.

7. The data creation system of claim 6, wherein
the straight feature concerns a boundary between a plurality of scan lines on the first image data depending on a line sensor camera that has shot the object.

8. The data creation system of claim 7, wherein
the straight feature is a feature based on a pixel value difference corresponding to a height difference between the plurality of scan lines, the height difference being caused, in a situation, depending on a difference in a distance from the line sensor camera to the object.

9. The data creation system of claim 1, wherein
the deformation about the object includes rotation of the object.

10. The data creation system of claim 1, wherein
the deformation about the object includes deformation of a shape of the object.

11. A learning system configured to generate the learned model using a learning data set, the learning data set including the learning data as the image data created by the data creation system of claim 1.

12. An estimation system configured to estimate a particular condition of the object as an object to be recognized using the learned model generated by the learning system of claim 11.

13. The data creation system of claim 1, further including a feature extractor configured to extract the first feature from the first image data, wherein
the feature extractor is included in a first processing device,
the feature assigner is included in a second processing device different from the first processing device, and
the first processing device is configured to transmit information representing the first feature to the second processing device.

14. A processing device functioning as the first processing device of the data creation system of claim 13.

15. A processing device functioning as the second processing device of the data creation system of claim 13.

16. A data creation system configured to create image data for use as learning data to generate a learned model about an object, the data creation system comprising:
a feature acquirer configured to acquire a linear feature; and
a feature assigner configured to assign the linear feature to the image data including a pixel region representing the object,
wherein the linear feature concerns a boundary between a plurality of scan lines depending on a line sensor camera to shoot the object.

17. A data creation method for creating, based on first image data, second image data for use as learning data to generate a learned model about an object, the data creation method comprising:
a deforming step including generating, based on the first image data including a pixel region representing the object, the second image data by causing deformation about the object to the first image data;
a removing step including removing a linear first feature present in the first image data;
a feature acquiring step including acquiring a second feature; and
a feature assigning step including assigning the second feature to the second image data.

18. A non-transitory storage medium storing a program designed to cause one or more processors to perform the data creation method of claim 17.

19. A data creation method for creating image data for use as learning data to generate a learned model about an object, the data creation method comprising:
a feature acquiring step including acquiring a linear feature; and
a feature assigning step including assigning the linear feature to the image data including a pixel region representing the object,
wherein the linear feature concerns a boundary between a plurality of scan lines depending on a line sensor camera to shoot the object.

20. An evaluation system configured to estimate a particular condition of an object, the evaluation system comprising a processing device and an estimation system,
the processing device being configured to: extract a linear first feature present in first image data including a pixel region representing an object; and output information representing the first feature thus extracted,
the estimation system being configured to output, in response to image data created by assigning a second feature to second image data, an estimation result similar to a situation where the first image data is subjected to estimation made about a particular condition of the object, the second image data being generated by removing the first feature from the first image data and causing deformation about the object to the first image data.

21. The evaluation system of claim 20, wherein
the deformation about the object includes at least one selected from the group consisting of rotation, flipping, translation, scaling up, and scaling down of the object.

22. The evaluation system of claim 20, wherein
the estimation system is configured to estimate the particular condition of the object using a learned model,
the evaluation system further includes a learning system configured to generate the learned model, and
the learned model being configured to output, in response to image data created by assigning a second feature to second image data, an estimation result similar to a situation where the first image data is subjected to estimation made about the particular condition of the object, the second image data being generated by removing the first feature from the first image data and causing deformation about the object to the first image data.

23. A learning system functioning as the learning system of the evaluation system of claim 22.

24. A processing device functioning as the processing device of the evaluation system according to claim 20.

25. An estimation system functioning as the estimation system of the evaluation system according to claim 20.

* * * * *